United States Patent
Hamano et al.

(10) Patent No.: US 8,648,904 B2
(45) Date of Patent: Feb. 11, 2014

(54) PROJECTOR, IMAGE PROJECTION METHOD, AND HEAD-UP DISPLAY DEVICE USING THE PROJECTOR

(75) Inventors: Yukiko Hamano, Kawasaki (JP); Ryosuke Kasahara, Yokohama (JP); Toshiyuki Kawasaki, Yokohama (JP)

(73) Assignee: Ricoh Company, Limited, Tokyo (JP)

( * ) Notice: Subject to any disclaimer, the term of this patent is extended or adjusted under 35 U.S.C. 154(b) by 957 days.

(21) Appl. No.: 12/431,244

(22) Filed: Apr. 28, 2009

(65) Prior Publication Data
US 2009/0289950 A1 Nov. 26, 2009

(30) Foreign Application Priority Data
May 20, 2008 (JP) .................................. 2008-131432

(51) Int. Cl.
H04N 7/00 (2011.01)
(52) U.S. Cl.
USPC ............ 348/115; 345/589; 348/576; 348/577
(58) Field of Classification Search
USPC ................... 348/744, 115, 576–577; 345/589
See application file for complete search history.

(56) References Cited

U.S. PATENT DOCUMENTS

| | | | |
|---|---|---|---|
| 5,969,829 A * | 10/1999 | Matsuda et al. | 358/475 |
| 6,020,090 A * | 2/2000 | Takada et al. | 430/1 |
| 6,354,707 B1 | 3/2002 | Jeon et al. | |
| 6,439,724 B1 | 8/2002 | Jeon et al. | |
| 6,987,606 B2 * | 1/2006 | Maeyama et al. | 359/298 |
| 6,992,812 B2 * | 1/2006 | Maeyama et al. | 359/298 |
| 7,072,527 B1 * | 7/2006 | Nako | 382/290 |
| 7,456,579 B2 * | 11/2008 | Yamazaki et al. | 315/169.3 |
| 7,492,495 B2 | 2/2009 | Ishihara et al. | |
| 7,675,227 B2 * | 3/2010 | Komoto et al. | 313/501 |
| 7,914,154 B2 * | 3/2011 | Obi et al. | 353/79 |
| 7,973,781 B2 * | 7/2011 | Nitta et al. | 345/204 |
| 7,982,384 B2 * | 7/2011 | Komoto et al. | 313/501 |
| 2003/0025649 A1 * | 2/2003 | Wynne Willson | 345/6 |
| 2003/0072501 A1 * | 4/2003 | Enomoto | 382/311 |
| 2004/0119995 A1 * | 6/2004 | Nishi et al. | 358/1.9 |
| 2006/0103912 A1 * | 5/2006 | Katoh et al. | 359/290 |
| 2007/0070307 A1 * | 3/2007 | Cheng et al. | 353/102 |

(Continued)

FOREIGN PATENT DOCUMENTS

| | | |
|---|---|---|
| JP | 2001-5098 | 1/2001 |
| JP | 2001-33753 | 2/2001 |

(Continued)

Primary Examiner — Patrice Winder
Assistant Examiner — Eyob Hagos
(74) Attorney, Agent, or Firm — Oblon, Spivak, McClelland, Maier & Neustadt, L.L.P.

(57) ABSTRACT

A projector projecting an image on an object by scanning the object with a light beam includes a light source; a divergence angle converter converting the divergence angle of the light beam; a light deflector deflecting the light beam in a light beam scanning direction and a direction perpendicular to the light beam scanning direction; alight deflector drive controller controlling the light deflector to form the focused light spots at the respective pixel positions of the object on the basis of positional data for the pixels; a light amount controller controlling light amount of the light beam on the basis of luminance data for the pixels; and an image processor correcting the luminance data on the basis of previously obtained deterioration data of the projected image and outputting the corrected luminance data to the light amount controller while outputting the positional data to the light deflector drive controller.

4 Claims, 14 Drawing Sheets

(56) References Cited

U.S. PATENT DOCUMENTS

| | | | |
|---|---|---|---|
| 2007/0080975 A1* | 4/2007 | Yamashita et al. | 345/591 |
| 2007/0097038 A1* | 5/2007 | Yamazaki et al. | 345/76 |
| 2008/0117387 A1* | 5/2008 | Hamano et al. | 353/85 |
| 2008/0180385 A1* | 7/2008 | Yoshida et al. | 345/102 |
| 2008/0246927 A1* | 10/2008 | Inoue et al. | 353/85 |
| 2009/0091718 A1* | 4/2009 | Obi et al. | 355/30 |
| 2010/0141555 A1* | 6/2010 | Rorberg et al. | 345/8 |

FOREIGN PATENT DOCUMENTS

| | | |
|---|---|---|
| JP | 2001-154263 | 6/2001 |
| JP | 2001-174919 | 6/2001 |
| JP | 2004-189112 | 7/2004 |
| JP | 2004-322680 | 11/2004 |
| JP | 2005-309221 | 11/2005 |
| JP | 2007-199251 | 8/2007 |
| JP | 2008-131099 | 6/2008 |

* cited by examiner

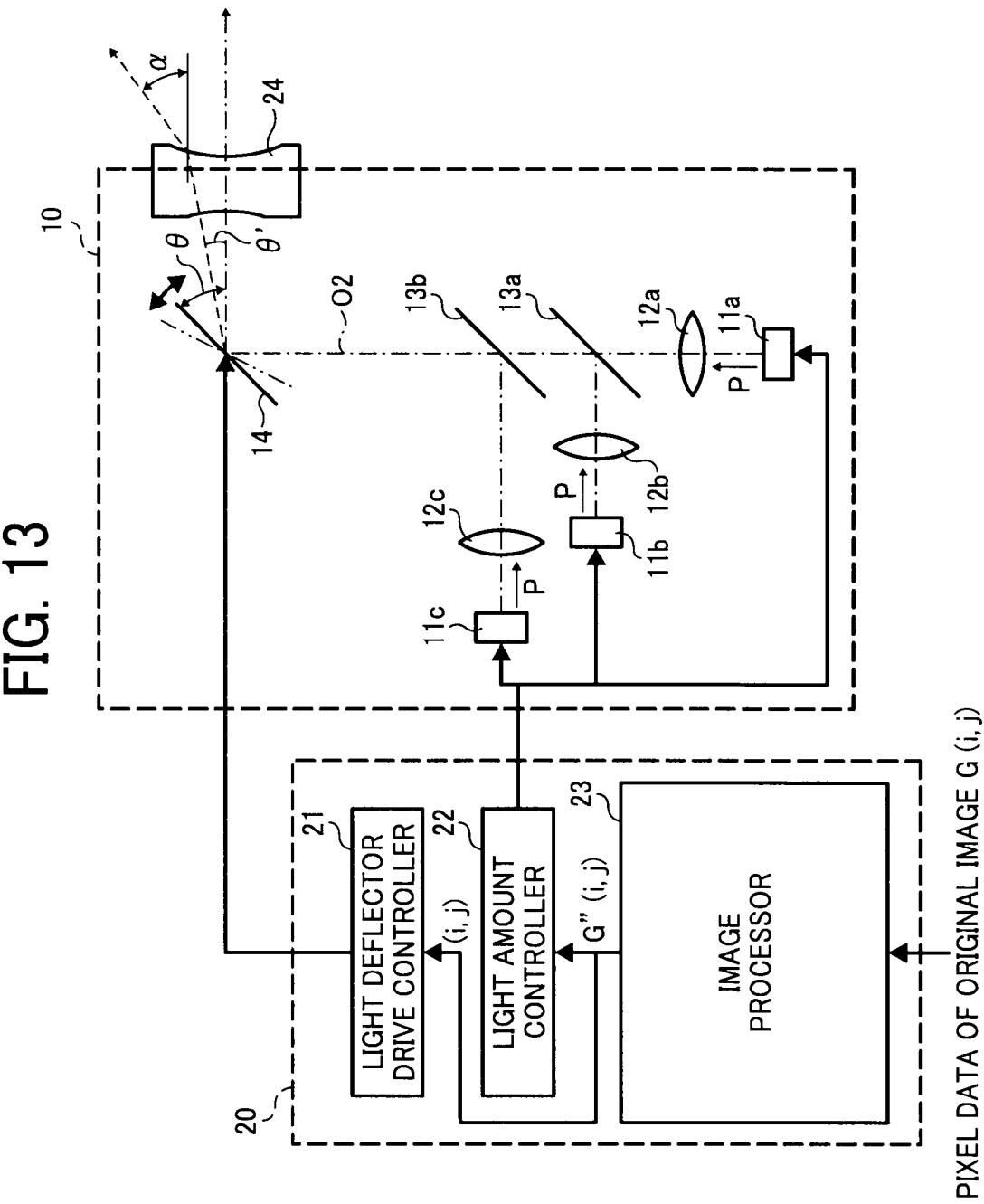

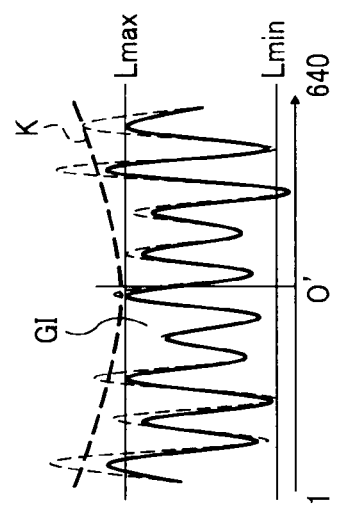 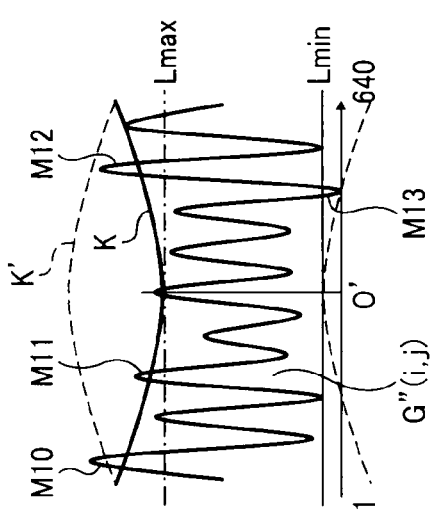 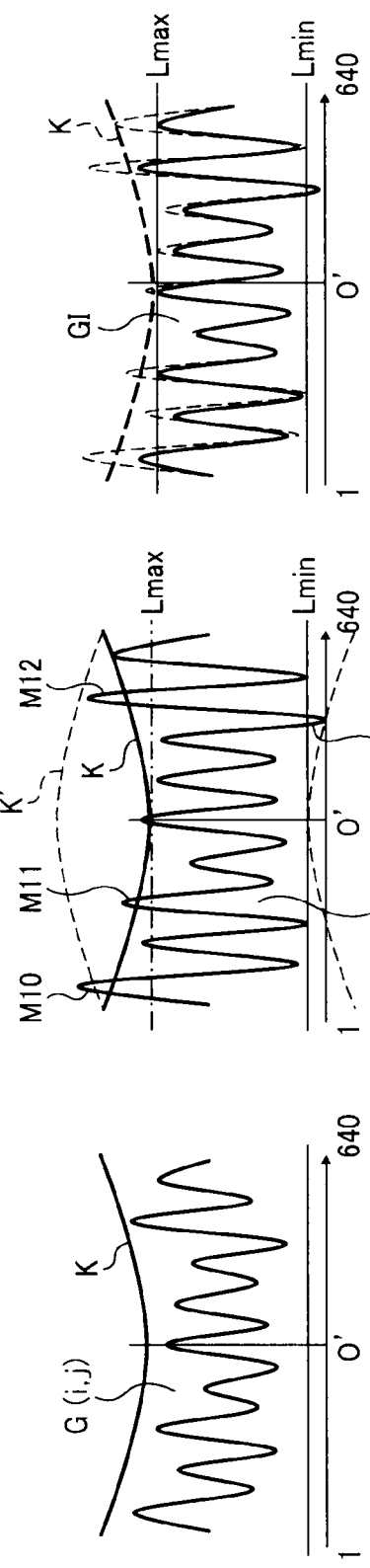 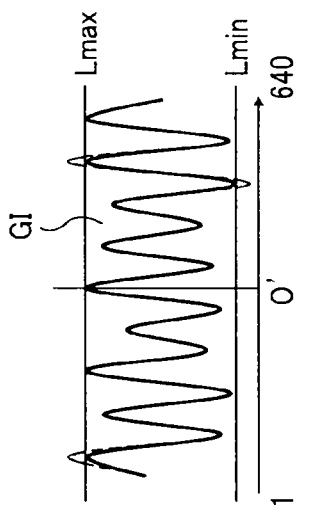 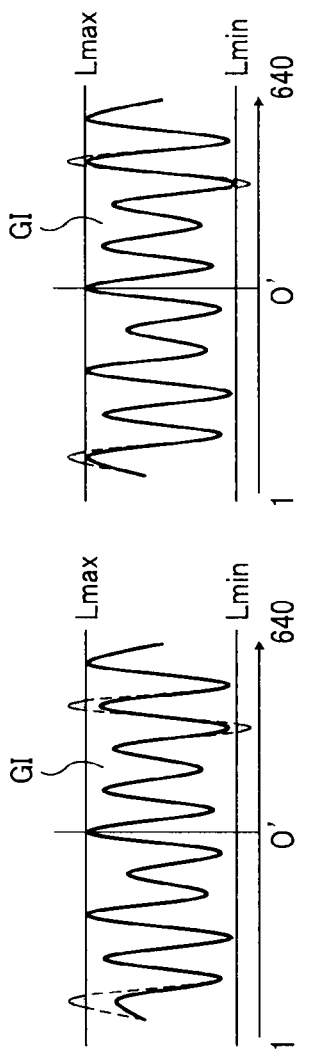 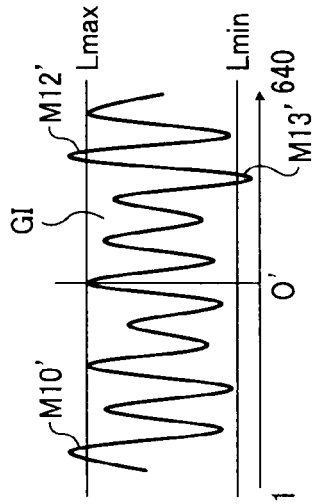

PROJECTOR, IMAGE PROJECTION METHOD, AND HEAD-UP DISPLAY DEVICE USING THE PROJECTOR

BACKGROUND OF THE INVENTION

1. Field of the Invention

The present invention relates to a projector which performs two-dimensional scanning using a light beam to project a two-dimensional image on an object. In addition, the present invention relates to an image projection method, and a head-up display device using the projector.

2. Discussion of the Background

Projectors including a lighting optical system, which includes a light source, a spatial light modulation device for forming a light image using light emitted from the light source, and a lens for projecting the light image, have been proposed and commercialized. With the spread of such projectors, an increasing need exists for small-size projectors. In order to fulfill such a need, small-size projectors using a LED or LD as a light source have been developed. Such projectors are used for small-size electronics devices such as mobile phones.

In addition, instead of using a spatial light modulation device, published unexamined Japanese patent applications Nos. 2001-154263, 2001-174919, 2005-309221 and 2007-199251 have disclosed light scanning methods in which a light beam emitted from a light source is two-dimensionally deflected using a light deflector to perform two-dimensional scanning on a projection object so that the scanned light beam is focused on the surface of the projection object. A person can observe such a scanned two-dimensional image as an image due to the afterimage effect.

Such light scanning methods typically use polygon mirrors, galvanometer mirrors, MEMS mirrors prepared by using a MEMS (Micro Electro-Mechanical Systems) technique, etc., as light deflectors.

FIG. 1 illustrates a background projector using a light scanning method. Referring to FIG. 1, the background projector includes a controller 1, and a light scanning device 2 as main components. The controller 1 includes a light amount controller 3, which controls the light amount of light emitted from a light source of the projector on the basis of the light amount control data corresponding to pixel data (i.e., luminance data $G(i,j)$) of an original image input to the light amount controller, and a light deflector drive controller 4, which controls the light deflection direction of a light deflector (e.g., galvanometer mirrors) on the basis of another pixel data (i.e., positional data) for the original image input to the light deflector drive controller.

The light scanning device 2 includes a light source 5 emitting a light beam P, a divergence angle converter 6 (e.g., projection lens), and a light deflector 7. The divergence angle converter 6 changes the divergence angle of the light beam emitted from the light source 5 so that a focused light spot S is formed on the surface of a projection object Sc (e.g., screens).

The light deflector 7 deflects the light beam emitted from the divergence angle converter 6 in a first scanning direction and a second direction perpendicular to the first scanning direction to form the focused light spot S at a pixel position $(i',J')$ corresponding to the position $(i,j)$ of the pixel of the original image. The light deflector drive controller 4 performs two-dimensional control on the light deflector 7 on the basis of the positional data $(i,j)$ so that the focused light spot S is formed at the pixel position $(i',J')$ corresponding to the pixel position $(i,j)$. The light amount controller 3 controls the light amount of light emitted from the light source 5 on the basis of the light amount control data corresponding to the luminance data $G(i,j)$ for each pixel of the original image.

Such a projector has a projection image deterioration problem in that qualities of projected images deteriorate depending on the properties of the projection optical system of the projector including the divergence angle converter 6 and the light deflector 7. For example, when an image is projected on the screen Sc using a movable mirror such as galvanometer mirrors as the light deflector 7, a need exists for short-range image projection or high resolution image projection. In this case, it is necessary to increase the slanting angle (amplitude of the movable mirror), i.e., a deflection angle θ illustrated in FIG. 1, while moving the mirror at a high speed. In addition, it is necessary to reduce the weight of the movable mirror by thinning the mirror and/or decreasing the area of the mirror in order that the movable mirror can be stably moved.

However, when the movable mirror is thinned, the mirror tends to be greatly bent when moved, thereby deteriorating the qualities of the focused light spot S, resulting in deterioration of resolution of the projected image. In order to decrease the area of the movable mirror is decreased, the size of the light beam P emitted from the light source 5 has to be decreased. In this regard, if the area of the movable mirror is small, diffraction phenomenon occurs, thereby deteriorating the qualities of the focused light spot S. Therefore, the area of the movable mirror has a lower limit.

Namely, as the distance of a pixel at a position $(i',j')$ from a center $O1'$ of the projected image, which corresponds to a center $O1$ of an optical axis of the projection optical system, becomes longer, the focused light spot S has a larger diameter or greatly deforms. Thus, such a background projector as projecting an image by scanning the screen Sc serving as a projection object with a light beam (i.e., focused light spot S) causes the projection image deterioration problem depending on the properties of the projection optical system thereof including the divergence angle converter 6 and the light deflector 7.

Because of these reasons, a need exists for a projector or an image projection method, which can solve the projection image deterioration problem caused by a projection optical system, without using any additional optical element.

SUMMARY OF THE INVENTION

As an aspect of the present invention, a projector is provided, which projects an image corresponding to an original image on a projection object by scanning the projection object with a light beam. The projector includes:

a light source configured to emit a light beam;
a projection optical system including:
  a divergence angle converter configured to convert the divergence angle of the light beam so that focused spots are formed on the projection object; and
  a light deflector configured to deflect the light beam from the divergence angle converter in a light beam scanning direction and a direction perpendicular to the light beam scanning direction to form the focused light spots on pixel portions of the projection object such that the positions of the pixel portions correspond to the positions of the pixels of the original image;
a light deflector drive controller configured to control the light deflector to form the focused light spots on the respective pixel portions of the projection object on the basis of positional data of the pixels;

a light amount controller configured to control the light amount of the light beam emitted by the light source on the basis of the luminance data of the pixels; and an image processor configured to correct the luminance data for each pixel on the basis of previously obtained data concerning deterioration in quality of the projected image caused by the projection optical system to prevent the deterioration in quality of each pixel portion of the projected image and to output the corrected luminance data to the light amount controller while outputting the positional data to the light deflector drive controller.

As another aspect of the present invention, an image projection method for projecting an image corresponding to an original image on a projection object is provided. The image projection method includes:

emitting a light beam;

converting the divergence angle of the light beam so that focused spots are formed on the projection object;

deflecting the light beam in a light beam scanning direction and a direction perpendicular to the light beam scanning direction to form the focused light spots on pixel portions of the projection object such that the positions of the pixel portions correspond to the positions of the pixels of the original image; and performing image controlling, including:
  correcting the luminance data for each pixel on the basis of previously obtained data concerning deterioration in quality of the projected image to prevent the deterioration in quality of each pixel portion of the projected image; and
  controlling the light amount of the light beam on the basis of the corrected luminance data while controlling the deflection angle on the basis of positional data of the pixels.

As yet another aspect of the present invention, a head-up display device is provided, which includes the projector mentioned above; and at least one of a partial reflection plane configured to reflect a light beam emitted from the light source of the projector, and an eyepiece optical system configured to convert the diffusion light beam emitted from the projector to parallel light beam.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein:

FIG. 13 is a block diagram illustrating the optical system and control system of the third example projector;

FIGS. 14A-14F are view for explaining the correction processing in the third example projector;

DETAILED DESCRIPTION OF THE INVENTION

The present invention will be explained in detail by reference to drawings and certain specific examples, which are provided herein for the purpose of illustration only and are not intended to be limiting.

EXAMPLES

Generic Example

Figure 1:
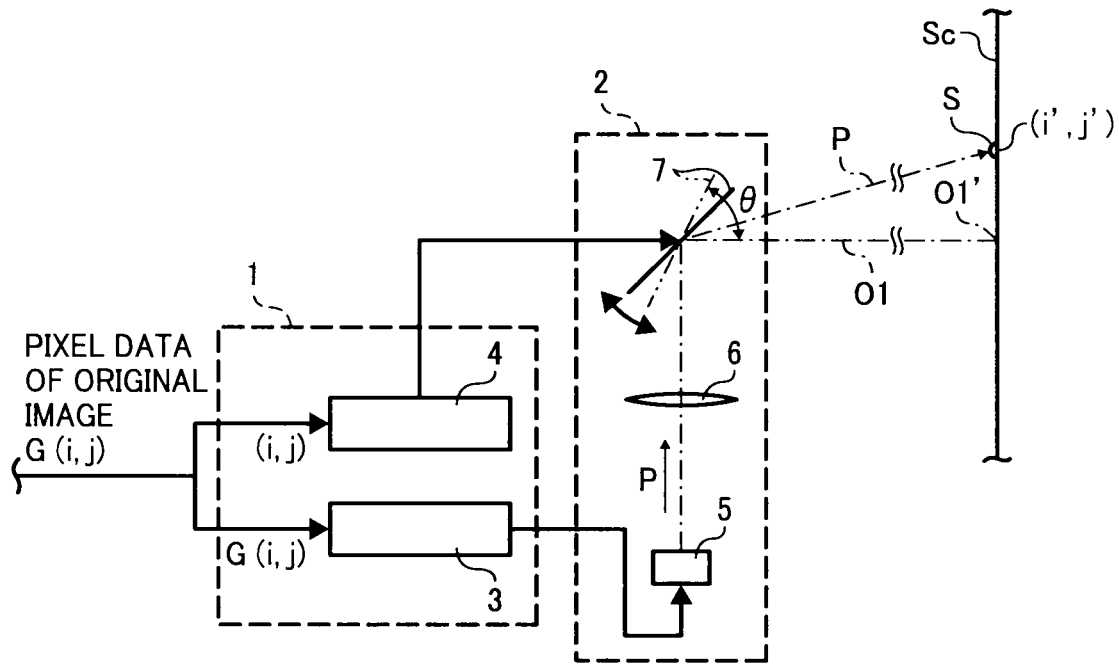
FIG. 1 is a schematic view illustrating the optical system of a background projector.
Figure 2:
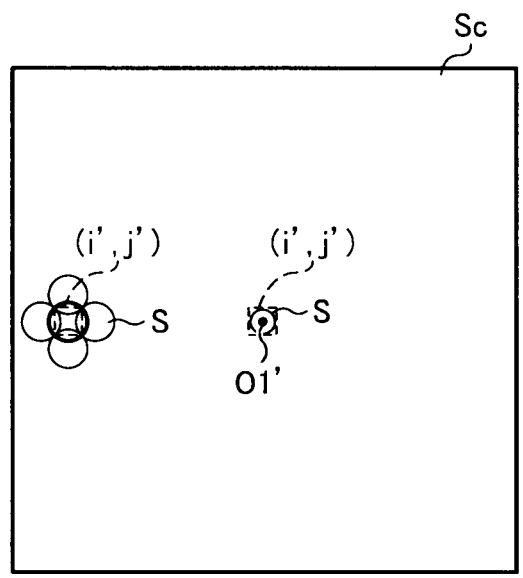
FIG. 2 is a view for explaining deterioration in quality of a focused light spot formed on a screen using the optical system of a background projector.
Figure 3:
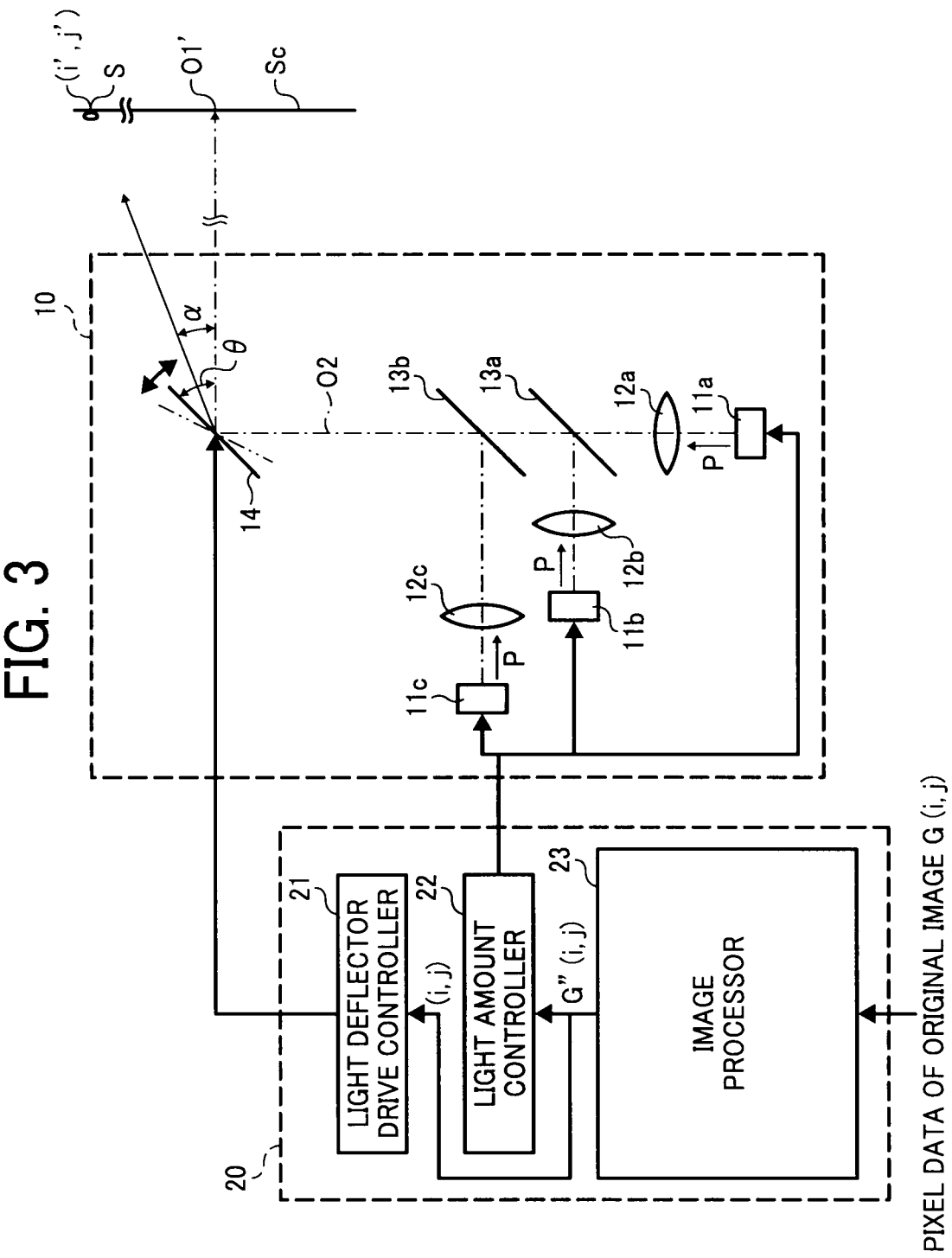
FIG. 3 is a block diagram illustrating the optical system and the controlling system of a generic example of the projector of the present invention.

FIG. 3 is a block diagram illustrating the optical system and the controlling system of a generic example of the projector of the present invention.

The projector includes a scanner 10 and a controller 20 as main components. The scanner 10 includes, as main components, a red light source 11a, a green light source 11b, a blue light source 11c, divergence angle converters (such as projection lenses) 12a, 12b and 12c, optical path synthesizers (such as optical path synthesizing mirrors) 13a and 13b, and a light deflector 14. The light sources 11a-11c, divergence angle converters 12a-12c, optical path synthesizers 13a and 13b, and light deflector 14 constitute a projection optical system, which projects an image on the screen Sc. As illustrated in FIG. 3, the projection optical system has an optical axis O2.

Monochrome light sources such as laser light sources (e.g., laser diodes) can be used for the red, green and blue light sources 11a, 11b and 11c. By using laser light sources emitting a light beam having a proper wavelength, clear images having a high color purity can be displayed. Specifically, a laser diode emitting a light beam having a wavelength of 460 nm is used for the blue light source 11c, a laser diode emitting a light beam having a wavelength of 638 nm is used for the red light source 11a, and the second harmonic component of a laser diode emitting a light beam having a wavelength of 1060 nm is used for the green light source 11b. The controller 20 performs drive controlling on the light sources 11 while controlling the light deflector 14. The details of the controlling operations will be explained later.

Red, green and blue light beams P emitted by the red, green and blue light sources 11a, 11b and 11c are condensed by the respective divergence angle converters 12a, 12b and 12c. Namely, the divergence angle converters 12a-12c convert diverging light beams to converging light beams. Specifically, the divergence angle converters 12a-12c have a function of converting the divergence angle of the light beams so that focused light spots S are formed on the screen Sc.

The converging light beams are subjected to a light path synthesis processing by the optical path synthesizers 13a and 13b, and the synthesized light beams are guided to the light deflector 14. The details of the light path synthesis processing will be explained later. The optical path synthesizers 13 are constituted of, for example, a dielectric multi-layer filter, and have such characteristics as to reflect light with a wavelength in a predetermined wavelength range while transmitting light with a wavelength in other wavelength ranges.

In this example, the optical path synthesizer 13a has characteristics such that 95% or more of green light having a wavelength in a range of from 510 nm to 570 nm is reflected, and 90% or more of light having a wavelength in other ranges is transmitted. The optical path synthesizer 13b has characteristics such that 95% or more of green light having a wavelength in a range of from 400 nm to 490 nm is reflected, and 90% or more of light having a wavelength in other ranges is transmitted.

The light beam emitted from the red light source 11a is converted to a converging light beam by the divergence angle converter 12a. The converging light beam transmits through the light path synthesizers 13a and 13b, and reaches to the light deflector 14.

The light beam emitted from the green light source 11b is converted to a converging light beam by the divergence angle converter 12b. After the converging light beam is reflected by the light path synthesizer 13a, the converging light beam transmits the light path synthesizer 13b, and reaches to the light deflector 14.

The light beam emitted from the blue light source 11c is converted to a converging light beam by the divergence angle converter 12c. The converging light beam is reflected by the light path synthesizer 13b to be guided to the light deflector 14.

The light deflector 14 deflects the light beams, which have been subjected to a light path synthesis processing, in predetermined directions while performing scanning to form focused light spots S on the predetermined positions of the screen Sc corresponding to the positions of the pixels of the original image. In FIG. 3, character α denotes a scan angle of the light deflector 14.

Figure 4:
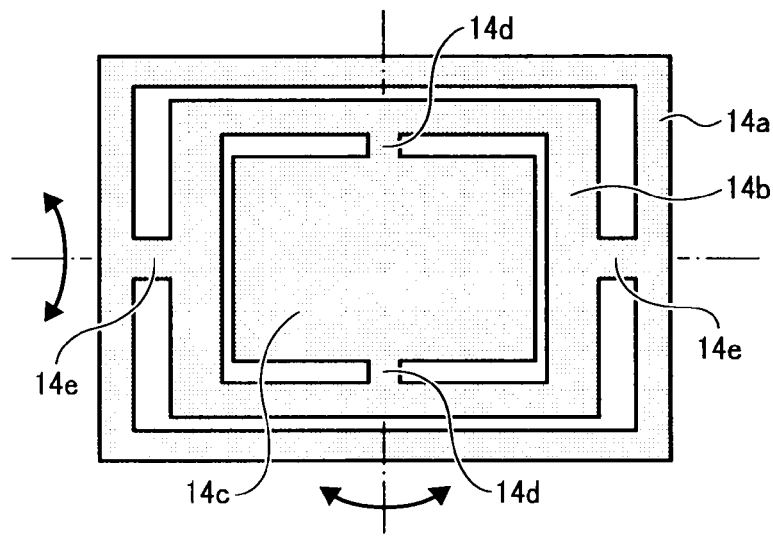
FIG. 4 is a plan view illustrating a MEMS mirror for use as a light deflector of the projector illustrated in FIG. 3.

An example of the light deflector 14 is illustrated in FIG. 4. Referring to FIG. 4, the light deflector 14 includes, as main components, an outer flame 14a serving as a first deflector performing one dimensional light deflection, and an inner flame 14b and a movable rectangular mirror 14c, which serve as a second deflector performing two dimensional light deflection. The movable mirror 14c is supported by a pair of first supports 14d so as to be able to rotate (pivot). In addition, the inner flame 14b is supported by a pair of second supports 14e extending in a direction perpendicular to the extending direction of the first supports 14d so as to be able to rotate (pivot).

The movable mirror 14c is rotated (pivoted) right and left on the pair of first supports 14d while the inner flame 14b is rotated (pivoted) up and down on the pair of second supports 14e. In this example, the light deflector 14 is constituted of a known MEMS mirror, which is made of a silicon crystal.

For example, such a MEMS mirror is prepared by using a combination of a silicone crystal plate and a bottom plate. By etching the combination, the movable mirror 14c and the inner frame 14b floating over the bottom plate can be formed.

In this MEMS mirror, right-and-left separated two electrodes are formed on the bottom plate located below the movable mirror 14c. By applying a voltage between the two electrodes and an electrode formed on the movable mirror 14c, the movable mirror 14c is slanted in such a direction that the pair of first supports 14d twist due to the electrostatic force caused by the applied voltage. In addition, up-and-down separated two electrodes are formed on the bottom plate located below the inner flame 14b. By applying a voltage between the two electrodes and an electrode formed on the inner flame 14b, the inner flame 14b is slanted in such a direction that the pair of second supports 14e twist due to the electrostatic force caused by the applied voltage.

In order to deflect light beams at a high speed using such a MEMS mirror as mentioned above, the movable mirror is preferably driven at a resonance point thereof. Therefore, the deflection angle is changed like a sine curve against time. Since the movable mirror 14c is rectangular in shape and the sides thereof have a short length of about 1 mm, the mirror has a small torque. Therefore, by properly designing the thickness and width of the pair of first supports 14d, the primary resonance frequency of the first supports in the twisting direction thereof can be heightened. Thus, the axis of rotation in the right and left directions can easily obtain a high primary resonance frequency.

It is difficult to impart a high amplitude to such a movable mirror by using a normal driving method. In addition, the movable mirror cannot be stably driven by such a method due to uneven driving force and air resistance. In contrast, in this MEMS mirror, by driving the movable mirror 14c at a frequency near the primary resonance frequency, the mirror can be stably driven and the amplitude of the mirror can be increased to such an extent that scanning is performed on the entire surface of the screen Sc.

The structure of the MEMS mirror is not limited thereto. For example, MEMS mirrors in which a magnetic body is formed on the backside of the movable mirror thereof, and the movable mirror is rotated (slanted or pivoted) by a magnetic force generated by a coil formed on a bottom plate can also be used.

Next, the light deflector 14 scans the screen Sc with the light beams, which have been subjected to the light path synthesis processing by the light path synthesizers 13a and 13b, in a first scanning direction (horizontal direction) and a second scanning direction (vertical direction) perpendicular to the first scanning direction.

In this generic example, the first deflector and the second reflector are integrated. However, the first and second deflectors may be separated from each other. For example, light deflectors, in which a planar mirror is attached to the output shaft of a stepping motor so that the mirror is rotated at a constant angular velocity, can also be used for such separate deflectors.

In order to project a high resolution image on the entire surface of a screen set close to the projector, it is necessary to widely swing (i.e., rotate or pivot) the movable mirror 14c. Namely, the amplitude or slanting angle (i.e., the deflection angle θ illustrated in FIG. 3) of the movable mirror 14c has to be heightened, and in addition the movable mirror has to be stably driven at a high speed. In this regard, if the area and thickness of the movable mirror 14c are decreased to reduce the weight of the mirror, the degree of bending of the mirror seriously increases when the mirror is driven, resulting in deformation of the focused light spots S formed on the screen Sc, i.e., deterioration in quality of the projected image.

In addition, in order to decrease the area of the movable mirror 14c, the size of the light beam has to be reduced. In this regard, the movable mirror functions as an aperture stop. Therefore, if the area of the movable mirror is reduced, the size of the focused light spots S increases due to occurrence of a diffraction phenomenon. Thus, when the area of the movable mirror is decreased, the qualities of the focused light spots S deteriorate. Further, as illustrated in FIG. 3, as the deflection angle θ becomes greater, the movable mirror is bent to a larger degree. In this case, the qualities of the focused light spots formed on the outer portion of the screen Sc deteriorate.

Further, in the projection optical system including the divergence angle converter 12a-12c and the light deflector 14, the qualities of the focused light spots S deteriorate depending on the optical properties of the projection optical system itself.

Figure 5A:
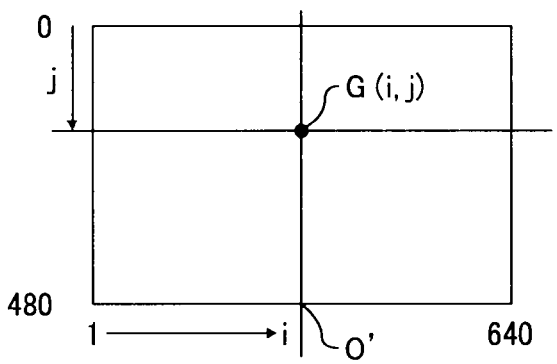
FIGS. 5A-5C are schematic views for explaining how the projection image deterioration problem occurs in a background projector.
Figure 5B:
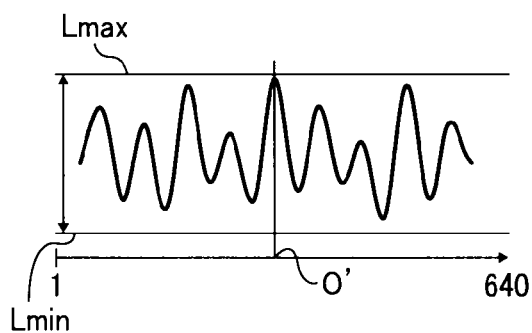
Figure 5C:
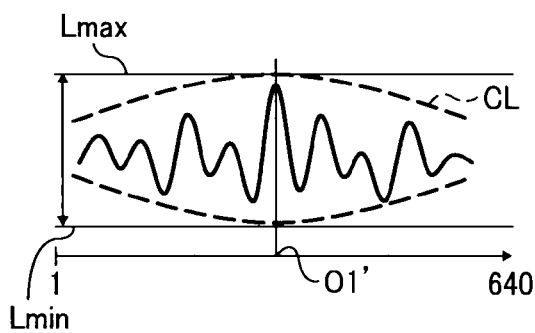

FIGS. 5A to 5C are schematic views for explaining deterioration in quality of projected images. FIG. 5A illustrates a pixel data array in which the horizontal and vertical directions are divided into 640 pixels and 480 pixels, respectively, and G(i,j) represents the luminance data of a pixel (i,j). Namely, characters i and j represent the positions of a pixel of an original image in the horizontal and vertical directions, respectively. The luminance data G(i,j) are present for each of red, green and blue light beams, but only the luminance data for a red light beam (i.e., the red light source 11a) are illustrated in FIG. 5 only for explanation purpose.

FIG. 5B is a graph illustrating the luminance data of the j-th line in the vertical direction, i.e., the luminance data of from G(1,j) to G(640,j). In FIG. 5B, the positions of pixels in the horizontal direction are plotted in the horizontal axis, and the luminances (or light intensities) of pixels are plotted in the vertical axis. A character O' represents the position of the center pixel in the j-th line. Lmax and Lmin represent the maximum and minimum luminances, respectively, in the luminance adjustable range.

As illustrated in FIG. 3, the controller 20 includes a light deflector drive controller 21 and a light amount controller 22. The light deflector drive controller 21 performs drive controlling on the light deflector 14 on the basis of the pixel positional data (i,j). For example, when a pixel (i,j) is projected on the screen Sc, the controller 20 outputs the luminance data G(i,j) of the pixel (i,j) to the light amount controller 22 while outputting a control signal for the light deflector 14 to the light deflector drive controller 21 in synchronization with the output of the luminance data to form a focused spot S at the corresponding position (i',j') of the screen Sc. Thereby, an image corresponding to the original image is projected on the screen Sc.

However, projection optical systems have a property such that the qualities of focused spots deteriorate (e.g., widening of focused spots) depending on the optical properties of the divergence angle converter (12a to 12c) and the optical properties of the light deflector (14). Therefore, as illustrated by dotted lines (i.e., envelope curves CL) in FIG. 5C, properties such as MTF (Modulation Transfer Function) and contrast of focused spots deteriorate as the spots depart far from the center O1' of the screen Sc.

In a case of conventional camera, when the qualities of an image formed through a focusing optical system of the camera deteriorate (for example, the image focused on a CCD thereof is deformed), deterioration of the image can be reduced by performing a filter image processing. By displaying the corrected image in a LCD after such a correction processing, a considerably clear image can be displayed in the LCD.

However, in a case of projector, it cannot be performed that a projected image is corrected and then the corrected image is projected again on a screen. Therefore, it is important to reduce (correct) deterioration in quality of a projected image.

In this regard, it is possible to previously determine the deterioration degree of a quality of each pixel of an image to be projected through a projection optical system on the basis of the properties of the projection optical system. The present invention is made on the basis of this technique.

Figures 6A, 6B, 6C:
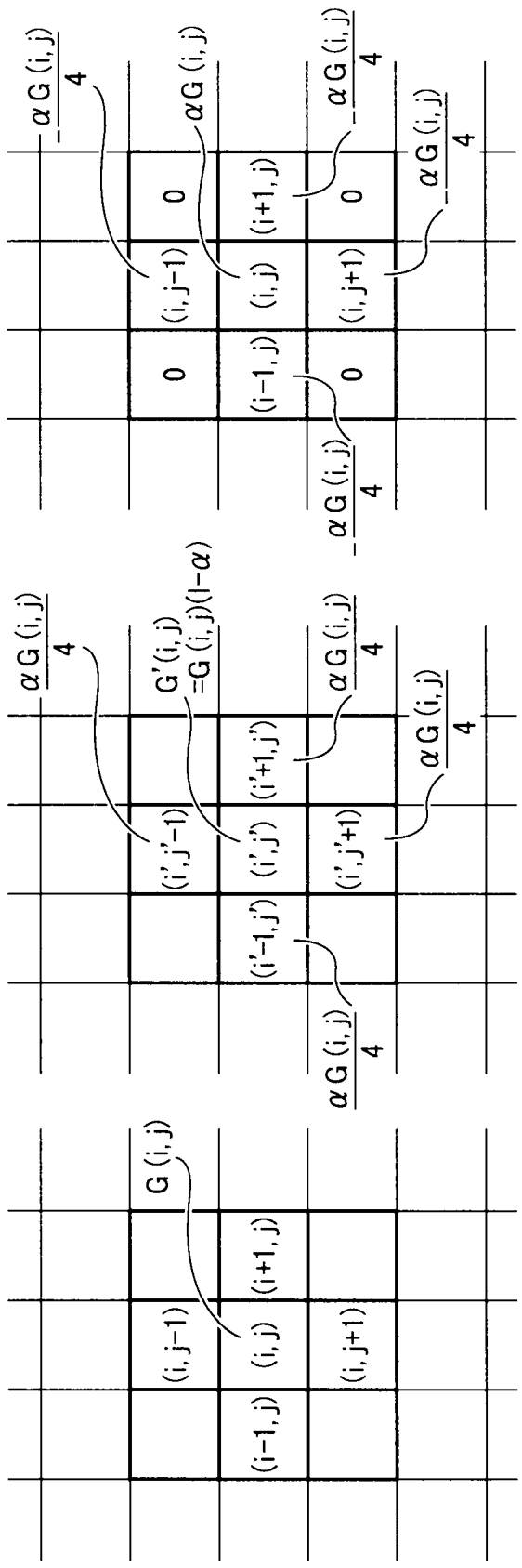
FIGS. 6A-6C and 7 are schematic views for explaining the correction processing in the generic example of the projector of the present invention.

This technique will be explained by reference to FIGS. 6A-6C illustrating luminance data G (of red light, for example) of a 9×9 pixel region including a center pixel (i,j) and 8 pixels surrounding the center pixel. In the following explanation, the color of the light beam is neglected only for explanation purpose.

Specifically, let's assume that by using the light amount control data corresponding to the luminance data G(i,j), which are not corrected, the red light source 11a is lighted to form a focused light spot S at the corresponding position (i',j') of the screen Sc as illustrated in FIG. 6B, wherein the light spot S has a luminance G'(i',j').

In addition, let's assume that the luminance of the noticed pixel (i,j) (i.e., the center pixel) illustrated in FIG. 6B is deteriorated at a rate of a (i.e., 100a in percentage). In this regard, the term "deterioration" is defined as decrease of light amount at the pixel position (i',j') corresponding to the position of the noticed pixel (i,j) due to enlargement of the focused spot S formed on the portion (i',j'). In this regard, it is assumed only for explanation purpose that the light amount corresponding to the decrease of light amount at the position (i',j') is uniformly shared by the upper, lower, left and right pixel portions adjacent to the pixel portion (i',j'), i.e., adjacent pixel portions (i',j'−1), (i'−1,j'), (i'+1,j'), and (i',j'+1). In this case, explanation of the pixel portions (i.e., portions (i'−1,j'−1), (i'−1,j'+1), (i'+1,j'−1), and (i'+1,j'+1)) present in the slanting directions from the noticed portion (i',j') is omitted (i.e., these pixel portions are neglected).

As illustrated in FIG. 6B, the luminance G'(i',j') at the noticed portion (i',j') is decreased to G(i,j) (1−α), and a luminance of αG(i,j)/4 is added to the luminance of each of the four adjacent pixel portions.

In order to correct the deterioration amount (i.e., reduced luminance) of the noticed pixel portion (i',j'), a FIR filter illustrated in FIG. 6C is typically used. However, it is impossible to directly perform a FIR filter processing on each of the pixel portions on the screen Sc. Therefore, in this generic example, by adjusting the light amount of light emitted from the light source 11a, the deterioration in quality of projected images due to the projection optical system used is corrected, i.e., a reverse MTF correction processing is performed.

Therefore, in this generic example, the controller 20 has an image processor 23 as illustrated in FIG. 3. The image processor 23 corrects the luminance data G(i,j) for each pixel on the basis of the previously obtained deterioration data to correct the deterioration in luminance of each pixel. Thus, the image processor 23 has a function of producing a corrected image, which is a group of pixel data subjected to the correction processing. By driving the light source 11a according to the light amount control data corresponding to the corrected luminance data, i.e., corrected pixel data subjected to the correction processing, deterioration in quality of projected images due to the projection optical system can be reduced.

In this regard, the correction amount of the luminance data G(i,j) of the noticed pixel (i,j) is not αG(i,j). This is because the luminance at the pixel portion (i',j') of the screen corresponding to the noticed pixel (i,j) is influenced by the adjacent pixel portions (i',j'−1), (i'−1,j'), (i'+1,j') and (i',j'+1).

In consideration of the deterioration of the luminance data G(i,j) of the noticed pixel (i,j) and the influence of luminance of the adjacent pixel portions, the corrected luminance data G''(i,j) of the noticed pixel (i,j) can be determined by the following equation (1).

$$G''(i,j) = \{G(i,j)/(1-\alpha)\} - \{G(i,j-1)\cdot\alpha/4\} - \{G(i-1,j)\cdot\alpha/4\} - \{G(i+1,j)\cdot\alpha/4\} - \{G(i,j+1)\cdot\alpha/4\} \quad (1)$$

In this regard, it is assumed that the luminance of the pixel portion (i',j') corresponding to the noticed pixel (i,j) is influenced by each of the adjacent pixel portions (i',j'−1), (i'−1,j'), (i'+1,j'), and (i',j'+1) in an amount of ¼ of the luminance thereof.

The correction equation (1) is used as a simple example so that the present invention can be easily understood. In reality, the corrected luminance data should be comprehensively determined by further considering other factors such as influence of the pixel portions (i.e., portions (i'−1,j'−1), (i'−1,j'+1), (i'+1,j'−1), and (i'+1,j'+1)) present in the slanting directions from the noticed pixel portion (i',j'), and interval between the center of the screen Sc and the focused spot S. This correction processing can be easily performed using an inverse correction filter of FIR filter (MTF filter).

In order that the luminance correction processing is easily understood, an example thereof will be explained by reference to concrete data.

For example, it is assumed that the luminance data G(i,j) of the noticed center pixel (i,j) is a level of 128 (i.e., an intermediate gray level) when the luminance is classified into 258 levels, each of the luminance data G(i',j'−1), G(i'−1,j'), G(i'+1,j'), and G(i',j'+1) of the adjacent pixel portions is a level of 258 (i.e., a white level), and the deterioration rate α of the luminance is 0.10 (i.e., 10%). In this case, the luminance data G'(i',j') of the center pixel portion (i',j') corresponding to the noticed pixel (i,j) is obtained as follows.

$$G'(i',j') = 128 - 12.8 + 25.6 = 140.8$$

Thus, the center pixel portion is observed as a slightly whitish gray color. The luminance data G'(i',j'−1), G'(i'−1,j'), G'(i'+1,j'), or G'(i',j'+1) of each adjacent pixel portion is obtained as follows.

$$G'(i',j'-1) = G'(i'-1,j') = G'(i'+1,j') = G'(i',j'+1) = 256 - 25.6 + 3.2 = 233.6$$

Thus, the adjacent pixel portions are observed as a slightly grayish white color. Therefore, the contrast between the center pixel portion and the adjacent pixel portions decreases, resulting in deterioration of image quality.

Next, the luminance data for each pixel is corrected using the above-mentioned correction equation (1).

The corrected luminance data G''(i,j) of the noticed center pixel (i,j) can be determined as follows.

$$G''(i,j) = \{128/(1-0.1)\} - 25.6 = 116.6$$

The luminance data G''(i,j−1), G''(i−1,j), G''(i+1,j) and G''(i,j+1) for the adjacent pixel (i,j−1), (i−1,j), (i+1,j) and (i,j+1) are the same and are determined as follows. In this case, it is assumed that the pixels adjacent to each of the adjacent pixels have a level of 256 (i.e., a white level) except for the noticed center pixel.

$$G''(i,j-1) = G''(i-1,j) = G''(i+1,j) = G''(i,j+1) = \{256/(1-0.1)\} - \{256 \times 0.1 \times \tfrac{3}{4}\} - 128 \times 0.1/4 = 262.0$$

The light source 11a is lighted on the basis of the light amount data corresponding to the corrected luminance data G''(i,j) to form the focused spot S on the center pixel portion (i',j') of the screen corresponding to the noticed center pixel. The rate of luminance contribution of the thus emitted light for forming the center pixel portion to the luminance data G''(i,j) of the center pixel portion (i',j') is 116.

$$6 \times (1-0.1) = 116.6 - 11.66 = 104.9$$

Similarly, the light source 11a is lighted on the basis of the light amount data corresponding to the corrected luminance data G''(i,j−1), G''(i−1,j), G''(i+1,j) and G''(i,j+1) for the adjacent pixels to form the focused spots S on the adjacent pixel portions of the screen. The rate of luminance contribution of the thus emitted light for forming the adjacent pixel portions to the luminance data G''(i,j−1), G''(i−1,j), G''(i+1,j) and G''(i,j+1) of the adjacent pixel portions is 262.0(1−0.1)=262.0−26.2=235.8. In other words, the rate of contribution of the thus emitted light for forming the adjacent pixel portions to the luminance G''(i,j) of the center pixel portion is 26.2. Therefore, the corrected luminance of the focused spot S formed on the center pixel portion (i',j') is 104.9+26.2=131.1, which is close to the target luminance 128 (i.e., the luminance of a focused spot formed on the screen without deterioration). The luminance of the focused spot S formed on each of the adjacent pixel portions (i',j'−1), (i'−1,j'), (i'+1,j') and (i',j'+1) is 235.8+26.2(3/4)+11.66/4=258.4 when it is assumed that the luminance of the pixels adjacent to the respective adjacent pixels (i,j−1), (i−1,j), (i+1,j) and (i,j+1) except for the center pixel (i,j) is 256 (e.g., the luminance of pixels (i−1,j−1), (i−2,j) and (i−1,j+1) adjacent to the adjacent pixel (i−1,j) is 256). Thus, the corrected luminance of the focused spot S formed on each adjacent pixel portion (i',j'−1), (i'−1,j'), (i'+1,j') and (i'+1,j'+1) is close to the target luminance 256 (i.e., the luminance of a focused spot formed on the screen without deterioration).

In a case where the luminance data G(i,j) for the noticed center pixel is 128, and the luminance data for each adjacent pixel (i,j−1), (i−1,j), (i+1,j) and (i,j+1) is 0 (black level), the corrected luminance data G''(i,j) for the center pixel (i,j) is {128/(1−0.1)}=142.2. By forming a focused spot on the center pixel portion (i',j') using the luminance data 142.2, the luminance data for the center pixel portion (i',j') is 142.2×0.9=127.98, which is close to the target luminance data 128.

As mentioned above by reference to an example, by projecting an image on the screen after performing the correction processing on the pixel data of the original image, the deterioration in quality of the projected image due to the projection optical system can be prevented.

The pixel data of each pixel of the original image, i.e., the luminance data G(i,j), are input to the image processor 23. The image processor 23 corrects the luminance data G(i,j) on the basis of the previously obtained deterioration data. Among the corrected pixel data, the corrected luminance data G''(i,j) are input to the light amount controller 22, and the positional data (i,j) are input to the light deflector drive controller 21.

The light amount controller 22 performs drive controlling on the light source 11a on the basis of the corrected luminance data G''(i,j). The light beam emitted from the light source 11a is converted to a converging light beam by the divergence angle converter 12a and then guided to the light path synthesizers 13a and 13b. The light beam passing through the light path synthesizers 13a and 13b is deflected by the light deflector 14 to form a focused spot S on the pixel portion (i',j') of the screen Sc corresponding to the pixel (i,j).

Although the luminance data G(i,j) can be corrected, the output of the light amount controller 22 has a limit (the output of the light source has a limit and the light amount controller performs controlling so as to match the limit of the output of the light source). Namely, the minimum value Lmin and the maximum value Lmax of the adjustable range (i.e., light amount control data) of the light amount controller 22 have respective limits.

Specifically, when the deterioration of image quality due to the projection optical system is serious, there is a case where the corrected luminance data G"(i,j) (white level) for the adjacent pixels (such as pixel (i,j−1)) exceed the maximum value Lmax of the adjustable range (i.e., light amount control data). In contrast, there is a case where the corrected luminance data G"(i,j) (black level) for the adjacent pixels (such as pixel (i,j−1)) are smaller than the minimum value Lmin of the adjustable range (i.e., light amount control data).

Figure 7:
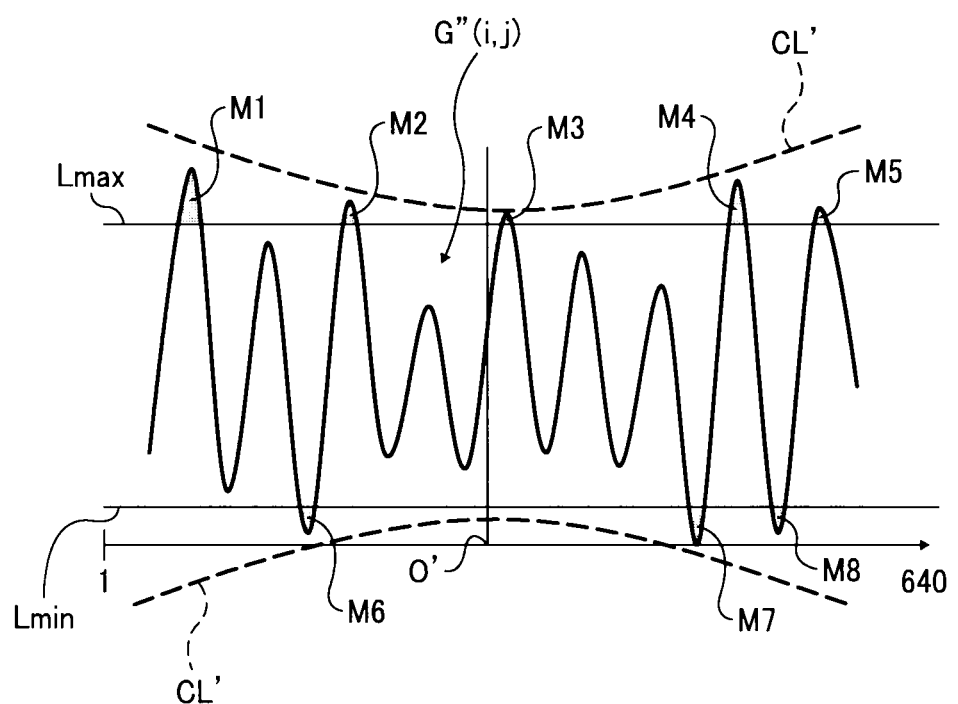

FIG. 7 is a schematic view illustrating a case where some luminance data G"(i,j) of pixels are greater than the maximum value Lmax or less than the minimum value Lmin of the adjustable range of the light amount controller 22.

Specifically, in FIG. 7, numeral CL' denotes an envelope curve of the luminance data G"(i,j) of pixels. In addition, numerals M1 to M5 denote pixels having a luminance data G"(i,j) greater than the maximum value Lmax, and numerals M6 to M8 denote pixels having a luminance data G"(i,j) less than the minimum value Lmin.

In such cases, the light source 11a cannot be properly driven by the light amount controller 22 even when using the corrected luminance data G"(i,j), resulting in deterioration in quality of projected images due to the luminance data correction processing.

Next, a method for correcting the deterioration of image quality due to the luminance data correction will be explained by reference to specific examples.

Example 1

Figure 8:
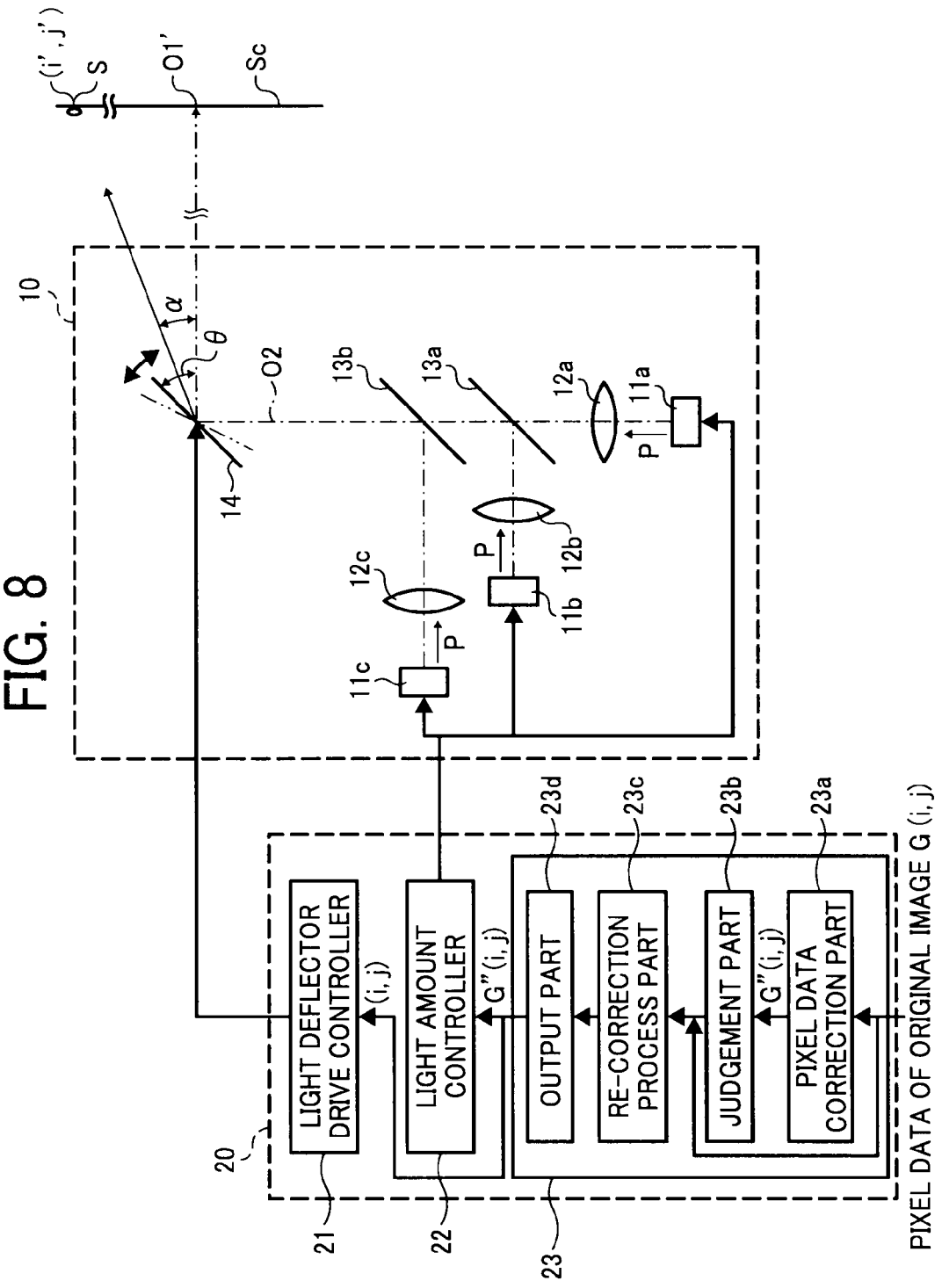
FIG. 8 is a block diagram illustrating the optical system and the controlling system of a first example of the projector of the present invention.

FIG. 8 is a block diagram illustrating an example of the projector of the present invention.

As illustrated in FIG. 8, the image processor 23 includes a pixel data correction part 23a configured to correct the luminance data G(i,j) for each pixel of the original image on the basis of the previously obtained deterioration data of projected images; a judgment part 23b configured to judge whether the corrected luminance data G"(i,j) for each pixel are greater than the maximum value Lmax (i.e., the maximum amount of light that the projector can supply) or less than the minimum value Lmin (i.e., the minimum amount of light that the projector can supply) in the adjustable range of the light amount controller 22; a re-correction process part 23c configured to change a luminance data G"(i,j) greater than the maximum value Lmax or less than the minimum value Lmin to a luminance data G"(i,j) within the adjustable range thereof; and an output part 23d configured to output positional data (i,j) of the re-corrected pixel data to the light deflector drive controller 21 while outputting luminance data G"(i,j) of the re-corrected pixel data to the light amount controller 22.

In this example, the re-correction processor 23c includes a substitution process part configured to substitute luminance data G"(i,j), which are judged to be greater than the maximum value Lmax or less than the minimum value Lmin by the judgment part 23b, with the luminance data G(i,j) for the original image (i.e., luminance data before correction).

For example, it is assumed that the non-corrected luminance data G(i,j) for a noticed pixel (i,j) are 256, and the corrected luminance data G"(i,j) thereof are 262, which is greater than the maximum value Lmax. In this case, there-correction processor 23c performs a re-correction processing such that the corrected luminance data G"(i,j) (i.e., 262) is substituted with the non-corrected luminance data G(i,j) (i.e., 256).

Figure 9:
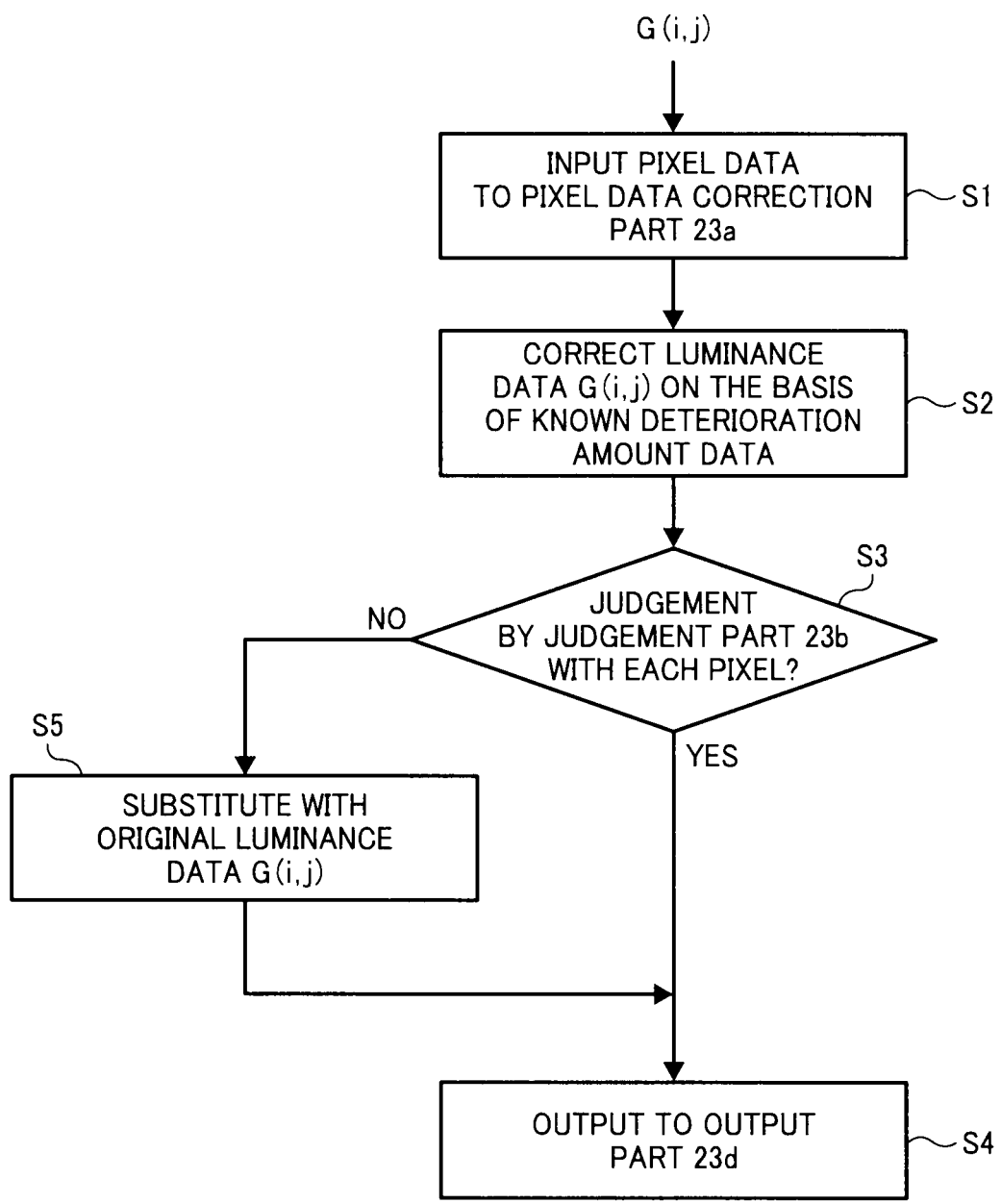
FIG. 9 is a flowchart of the correction processing of the first example projector.
Figure 10:
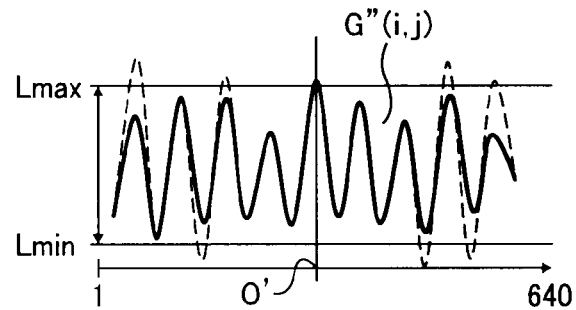
FIG. 10 is a graph illustrating the luminance data of the j line of pixels after the re-correction processing of the first example projector.
Figure 11:
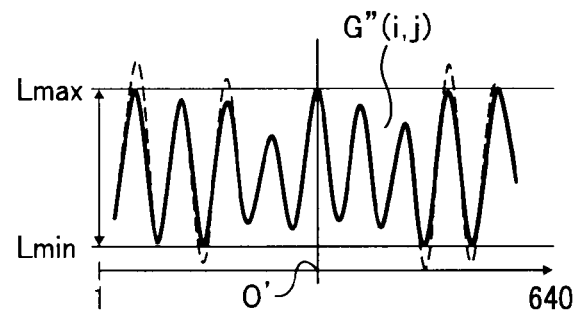
FIG. 11 is a graph illustrating the luminance data of the j line of pixels after the re-correction processing in a second example of the projector of the present invention.

FIG. 9 is a flowchart illustrating an example of the correction processing.

At first, luminance data G(i,j) for each pixel of the original image are input to the pixel data correction part 23a in step S1. The pixel data correction part 23a corrects the luminance data G(i,j) for each pixel on the basis of known (previously obtained) deterioration data in step S2. The judgment part 23b judges whether the corrected luminance data G"(i,j) for each pixel fall within the adjustable range in step S3. In this regard, the judgment part 23b may perform the judgment for 2×2 pixels instead of each pixel.

If the corrected luminance data G"(i,j) fall within the adjustable range (YES in step S3), the re-correction process part 23c outputs the luminance data to the output part 23d in step S4 without correction. If the corrected data G"(i,j) do not fall within the adjustable range (NO in step S3), the re-correction process part 23c substitutes the corrected data G"(i,j) with the original data G(i,j) (step S5) and outputs the data to the output part 23d (step S4). The output part 23d outputs the pixel data, which are input from the re-correction process part 23c and which includes luminance data and positional data, to the light amount controller 22 and the light deflector drive controller 21. The light amount controller 22 controls the light source 11a on the basis of there-corrected luminance data G"(i,j). In addition, the light deflector drive controller 21 controls the light deflector 14 on the basis of the positional data (i,j). Thus, light beam scanning is performed and a focused spot S is formed on a pixel portion (i',j') of the screen Sc corresponding to the pixel (i,j).

By performing the above-mentioned re-correction processing, the corrected luminance data G"(i,j) are substituted with the original luminance data G(i,j) in the re-correction processing. Therefore, deterioration of image quality due to the correction processing can be prevented. When this re-correction processing is performed for R, G and B colors, the ratio of the color data for each pixel after the correction processing is the same as that for the original image. Therefore, the projected image has good color reproducibility.

Example 2

In this example, the re-correction process part 23c includes a substitution process part, which substitutes a corrected luminance data judged to be greater than the maximum value Lmax of the adjustable range with the maximum value and which substitutes a corrected luminance data judged to be less than the minimum value Lmin with the minimum value.

When the judgment part 23b judges that the luminance data (strength data) of one of R, G and B colors is greater than the maximum value L max, the substitution process part 23c substitutes the corrected luminance data with the maximum value Lmax while adjusting (re-correcting) the luminance data of the other two colors so that the ratio of the re-corrected luminance data for the three colors is the same as that of the data before the re-correction processing. Similarly, when the judgment part 23b judges that the luminance data (strength data) of one of R, G and B colors is less than the minimum value Lmax, the substitution process part 23c substitutes the corrected luminance data with the minimum value Lmin while adjusting the luminance data of the other two colors so that the ratio of the re-corrected luminance data for the three colors is the same as that of the data before the re-correction processing.

For example, it is assumed that the luminance data of a noticed pixel (i,j) for the R, G and B colors before correction are 120, 120 and 240, respectively, and the corrected luminance data $G''_B(i,j)$ for the B color is greater than the maximum value Lmax (=260) and is thereby constituted with the maximum value. In this case, the substitution process part 23c substitutes the luminance data (120) for each of the R and G colors with a luminance data of 130 so that the ratio of the R and G color luminance data to the B color luminance data is constant (i.e., 120/240=130/260).

By performing such a re-correction processing, the corrected luminance data $G''(i,j)$ greater than the maximum value Lmax are substituted with the maximum value and the luminance data less than the minimum value Lmin are substituted with the minimum value. Therefore, deterioration of image quality due to the correction processing can be prevented. In addition, since the ratio of the R, G and B color data is the same as that of the original image (i.e., same as the ratio of the color data before correction), the projected image has good color reproducibility.

Example 3

When a MEMS mirror is driven in the vicinity of the resonance point thereof to reflect a light beam at a high speed, the deflection angle of the MEMS mirror changes with time like a sine wave.

Figure 12A:
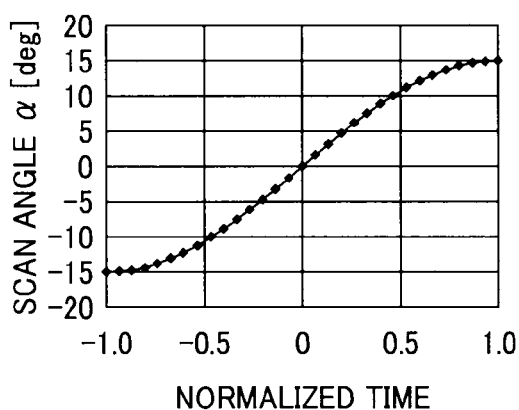
FIGS. 12A-12B are graphs for explaining the light deflector drive controlling in a third example of the projector of the present invention.

FIG. 12A is a graph illustrating the relationship between time (normalized time) and the scan angle α of a MEMS mirror. In FIG. 12A, the scan angle is 0 at a time 0, and the maximum of the scan angle (i.e., the maximum amplitude) is 15°, i.e., the scan angle ranges from −15° to +15°. The time is half the resonance frequency, namely a quarter of the resonance frequency is normalized as a time of 1 in FIG. 12A.

Figure 12B:
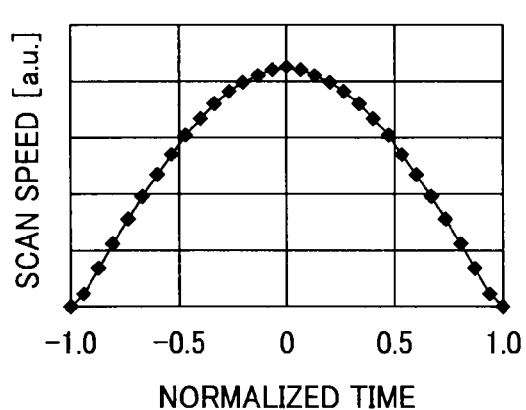

FIG. 12B is a graph illustrating the relationship between the normalized time and the scan speed of the MEMS mirror.

As can be understood from FIGS. 12A and 12B, the scan speed of the MEMS mirror is the fastest at a time 0 (i.e., at a time the scan angle α is 0), and the larger the scan angle, the slower the scan speed. Therefore, when scanning is performed using a light beam having a constant light amount, a spot S formed on a portion of the screen Sc by the MEMS mirror at a time the scan angle is lower seems to be darker, and a spot S formed on another portion of the screen by the MEMS mirror at a time the scan angle is higher seems to be lighter. This is because the exposure is different between the center portion and the peripheral portions.

When the amplitude of the MEMS mirror is great (i.e., the scan angle α is wide), the degree of distortion of the MEMS mirror is high at a high scan angle. Therefore, the focusing property of a spot S deteriorates as the spot departs from the center of the screen toward the peripheral portion of the screen.

In addition, when an optical element 24 is set at a position between the light deflector 14 and the screen Sc as illustrated in FIG. 13 to further increase the deflection angle of the light deflector 14, aberration caused by the optical element 24 seriously increases as the scan angle α increases, resulting in deterioration of the focusing property of the spot S at high scan angle.

The optical element 24 and the divergence angle converter 12a-12c are, for example, double-side aspheric lenses having an aspheric surface at both sides. When the aspheric surface is represented by an orthogonal coordinate system such that the summit of the plane is the origin and the optical axis direction is the X-axis (+X direction), the aspheric surface is represented by the following equation (2).

$$x = \frac{\frac{1}{r}R^2}{1+\sqrt{1-(1+k)\frac{1}{r^2}R^2}} + AR^4 + BR^6 + CR^8 +$$

$$DR^{10} + ER^{12} + FR^{14} + GR^{16} + HR^{18} + JR^{20} + \ldots$$

$$R = \sqrt{y^2 + z^2}$$

In equation (2), character x represents the distance of the plane in the optical axis direction, character y represents the distance of the plane in the direction perpendicular to the optical axis direction, character z represents the distance of the plane in the direction perpendicular to the x and y directions, character r represents the paraxial curvature, character k represents the cone coefficient, and characters A, B, C, D, E, F, G, H, J, . . . represent the aspheric coefficients.

The plane data and the data concerning the materials of the lens for use in the optical element 24 are shown in Tables 1-1, 1-2, 2-1 and 2-2 below.

TABLE 1-1

| Plane No. | Type of plane | Curvature (mm) | Plane distance (mm) | Glass material used |
|---|---|---|---|---|
| First plane | Aspheric | −275.55 | 1.65 | MLAF81_HOYA |
| Second plane | Aspheric | −1.79 | — | — |

TABLE 1-2

| Aspheric coefficients | First plane | Second plane |
|---|---|---|
| k | −2.51E+38 | −0.56 |
| A | 7.36E−03 | 2.75E−03 |
| B | −1.59E−03 | 9.01E−04 |
| C | 9.01E−03 | 1.92E−04 |
| D | 3.95E−03 | 5.86E−04 |
| E | −5.48E−03 | 0 |
| F | −3.01E−04 | 0 |

TABLE 2-1

| Plane No. | Type of plane | Curvature (mm) | Plane distance (mm) | Glass material used |
|---|---|---|---|---|
| First plane | Aspheric | 12.37 | 1 | BK7_SCHOTT |
| Second plane | Aspheric | 2.87 | — | — |

TABLE 1-2

| Aspheric coefficients | First plane | Second plane |
|---|---|---|
| k | −249 | −7.40 |
| A | −2.83E−02 | −1.01E−02 |

TABLE 1-2-continued

| Aspheric coefficients | First plane | Second plane |
|---|---|---|
| B | 2.84E−03 | 1.42E−03 |
| C | 6.93E−04 | −2.43E−04 |
| D | −5.01E−03 | −3.24E−04 |
| E | 3.45E−03 | 1.98E−04 |
| F | 0.00E−00 | 0.00E−00 |

By using the optical element 24, the scan angle α is increased to 15° even when the deflection angle θ' is 7.5°. Therefore, the projection distance between the deflector and the screen can be shortened if the size of the projected image is the same. In this regard, the size of the focused spot S is about 0.8 mm when the deflection angle θ' is 0°, but the size of the focused spot is twice (1.6 mm) when the deflection angle is 7.5° although the scanning angle can be widened to 15°.

The optical element 24 may have a function such as distortion correction function and trapezoid correction function, but has a property such that as the focused spot S departs farther from the center of the screen, the property of the spot deteriorates to a larger degree. However, unlike projectors which perform uniform illumination on spatial light modulation devices such as conventional liquid crystals and micro-mirror arrays and project an image using a projection lens, the projector of this example has a property such that the light amount of a light beam projected to the peripheral portions of the screen can be increased. Therefore, it is possible to prevent deterioration of image quality at the peripheral portions using the property.

Specifically, when sine wave drive is performed on the light deflector, the strength of the focused spot S formed on the basis of the luminance data of the original image increases as the focused spot departs farther from the center O2 of the optical axis (i.e., a center O1' of the screen Sc) as illustrated in FIG. 14A. Therefore, the light amount distribution curve rises toward the peripheral portions of the screen from the center O1' of the screen. In FIG. 14A, numeral K denotes the top and bottom end curves of the light amount distribution curve.

Therefore, in the cases of Examples 1 and 2 in which the corrected luminance data G"(i,j) are compared with the maximum or minimum value (Lmax or Lmin) to be re-corrected, there is a case where even when the corrected luminance data G"(i,j) are in the adjustable range, the luminance data are judged not to be adjustable. Accordingly, in this example, the luminance data G(i,j) are corrected by the method as illustrated in FIG. 15.

Figure 15:
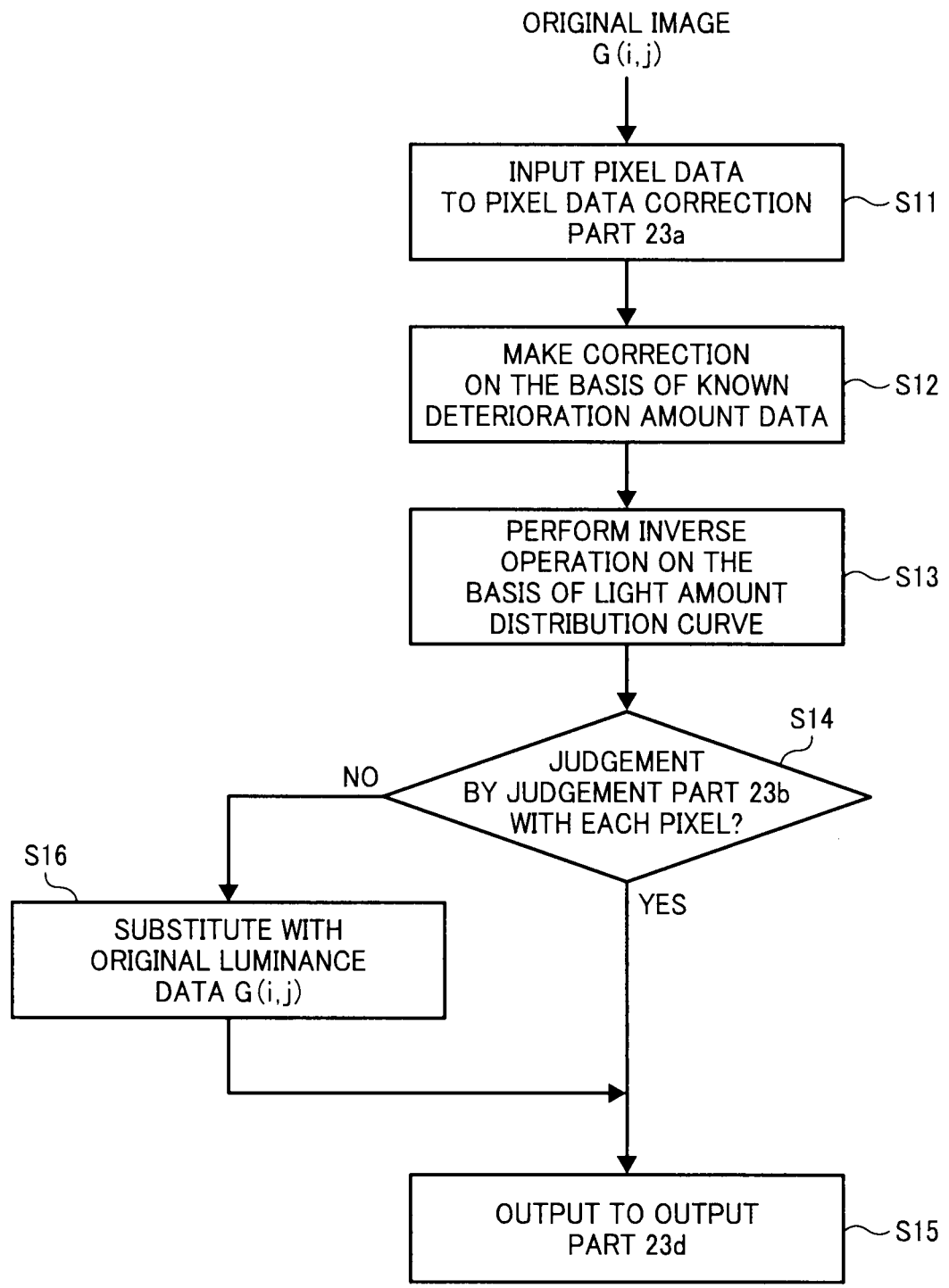
FIG. 15 is a flowchart illustrating an example of the correction processing in the third example projector.

Referring to FIG. 15, at first the luminance data G(i,j) for each pixel of the original image are input into the pixel data correction part 23a in step S11. The pixel data correction part 23a performs correction processing on each pixel on the basis of known (previously obtained) deterioration data in step S12, and thereby such corrected luminance data G"(i,j) as illustrated in FIG. 14B are obtained. In this regard, FIG. 14B is a graph illustrating the corrected luminance data G"(i,j) in a line of j (i is from 1 to 640) corresponding to the luminance data G(i,j) of the original image. In FIG. 14B, some points (i.e., points M10 to M13) of the corrected luminance data G"(i,j) apart from the center O2 of the optical axis (i.e., the center O1' of the screen) exceed the top and bottom limit curves K. Namely, the points M10 to M13 fall out of the adjustable range.

Next, the pixel data correction part 23a performs light amount correction processing using the inverse characteristic of the end curves K. Specifically, a correction processing is performed on the corrected luminance data G"(i,j) using inverse curves K' of the end curves K in step S13. Thereby, corrected luminance data GI(i,j) as illustrated in FIG. 14C can be obtained.

The thus obtained corrected luminance data GI(i,j) are input to the judgment part 23b. The judgment part 23b judges whether the corrected luminance data GI(i,j) for each pixel fall within the adjustable range in step S14. As illustrated in FIG. 14D, the luminance data GI(i,j) of three points M'10, M'12 and M'13 fall out of the adjustable range. As mentioned above, in this regard, the judgment part 23b may perform the judgment for 2×2 pixels instead of each pixel.

If the corrected data GI(i,j) fall within the adjustable range (YES in step S14), there-correction process part 23c outputs the data to the output part 23d in step S15 without correction. If the corrected data GI(i,j) do not fall within the adjustable range (NO in step S14), the re-correction process part 23c substitutes the corrected luminance data GI(i,j) with the original data G(i,j) in step S16 and outputs the data to the output part 23d (step S15). FIG. 14E illustrates the luminance data GI(i,j) re-corrected by there-correction process part 23c. The output part 23d outputs the pixel data, which are input from the re-correction process part 23c and which includes luminance data and positional data, to the light amount controller 22 and the light deflector drive controller 21. The light amount controller 22 controls the light source 11a on the basis of the re-corrected luminance data GI(i,j). In addition, the light deflector drive controller 21 controls the light deflector 14 on the basis of the positional data (i,j). Thus, light beam scanning is performed and a focused spot is formed on a pixel portion (i',j') of the screen Sc corresponding to the pixel (i,j).

Thus, in this example (Example 3), the correction processing is performed in consideration of the light amount distribution property. Therefore, the dynamic range of the adjustable range of the luminance data GI can be widened.

In the re-correction processing of Example 3, the corrected luminance data GI(i,j) falling out of the adjustable range are substituted with the original luminance data G(i,j) similarly to the re-corrected processing in Example 1. However, it is possible to use the re-correction processing of Example 2, i.e., to substitute such luminance data GI(i,j) with the maximum or minimum value (Lmax or Lmin) as illustrated in FIG. 14F.

The effects of the techniques used for Examples 1 to 3 are as follows.

Figure 16:
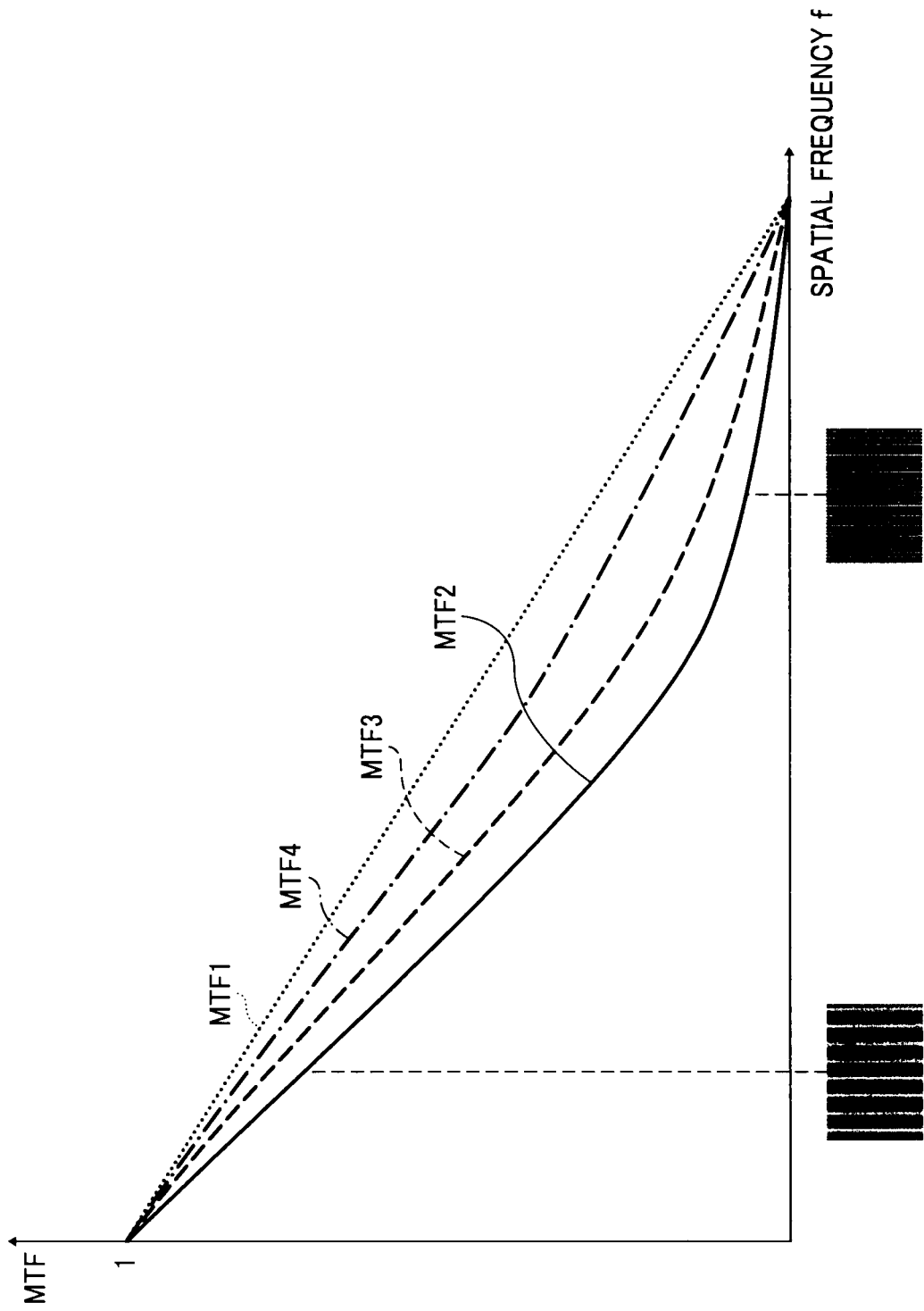
FIG. 16 is a graph illustrating the effects of the first to third examples of the projector of the present invention using MTF curves.

FIG. 16 is a graph illustrating the relationship between the spatial frequency of a projected image subjected to Fourier transformation and the MTF strength at peripheral portions of the screen Sc. The spatial frequency is plotted on the horizontal axis, and the MTF (i.e., contrast value (light/dark ratio)). In FIG. 16, the contrast is normalized and the maximum value thereof is 1.

Referring to FIG. 16, a cure MTF1 is the MTF curve of the original image. As can be understood from FIG. 16, this original image includes line images having a characteristic such that MTF linearly changes against the spatial frequency f.

When such an original image is projected on the screen Sc using a projection optical system without correction, the quality of the projected image deteriorates due to deterioration in quality of the focused spots S. As can be understood from FIG. 16, the degree of deterioration in quality of the focused spots illustrated by a curve MTF2 is greater at the high frequency side. Namely, when the original image is projected on the screen Sc using a projection optical system without correction, the contrast of line images deteriorates (i.e., blurred line images are formed) at the high frequency side.

In contrast, when the original image is corrected using an inverse MTF processing as explained in Examples 1 and 2 and an image is projected using the projection optical system and the corrected luminance data G"(i,j), the MTF property thereof is improved as illustrated by a curve MTF3. Therefore, the quality of the projected image concerning blurring is improved, resulting in formation of a higher-quality projected image.

In addition, by using the technique as explained in Example 3 such that a MEMS mirror having a property such that the light amount of the peripheral portions of a screen is larger is used; an inverse correction processing in consideration of light amount distribution characteristics is performed on the luminance data to obtain the re-corrected luminance data GI (i,j); and an image is projected on the screen using the re-corrected luminance data, the MTF is improved as illustrated by a MTF4, resulting in formation of higher-quality projected images.

In addition, according to the invention as explained in Example 3, high quality focused spots S can be formed even on (peripheral) portions of a screen, in which the light amount of focused light spots is not even, without performing light shielding. Therefore, high quality images can be projected while preventing deterioration of light utilization efficiency (i.e., preventing increase of electric power consumption).

Further, by using the technique as explained in Example 3 such that the correction processing is performed on the basis of the property of the projector such that the deterioration degree of MTF of focused spots increases as the spots depart from the center of the screen, the adjustable range can be enhanced, and thereby the dynamic range can be enhanced in the correction processing.

Example 4

Figure 17:
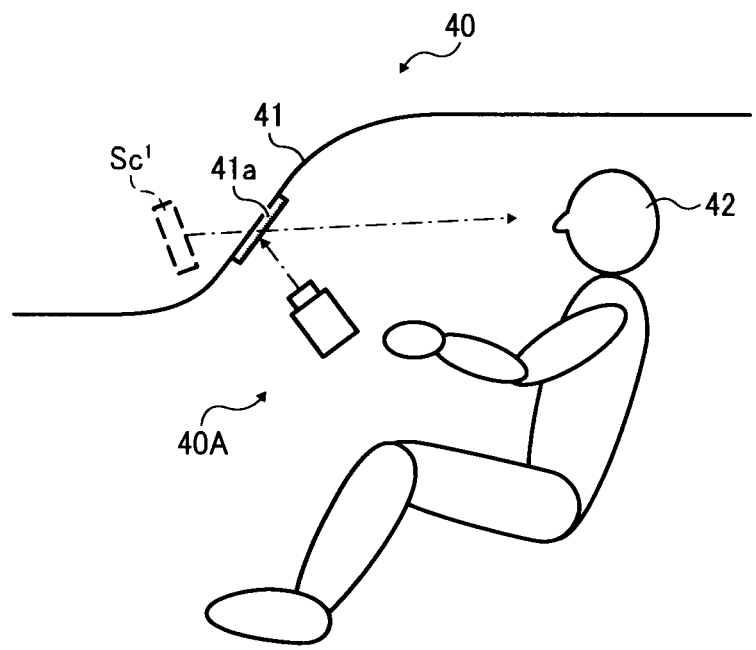
FIG. 17 is a schematic view illustrating an example of the vehicle-use head-up display device of the present invention.

FIG. 17 illustrates a head-up display device for use in vehicles.

Referring to FIG. 17, a head-up display device 40 includes a projector 40A, which is the projector of the present invention, and a front window glass 41 reflecting the image emitted from the projector 40A. On a surface of the front window glass 41, a partial reflection plane 41a reflecting light beams emitted from the light sources 11a to 11c of the projector 40A is formed. A metal film or a multiple dielectric layer may be formed on the surface of the partial reflection plane 41a to improve the reflectance of the light beams emitted from the light sources 11a to 11c. The partial reflection plane 41a reflects the light beams emitted from the light sources 11a to 11c toward the eyes of a driver 42 while transmitting light from the outside of the vehicle.

The projector 40A forms an image at a predetermined position in the optical axis direction. Specifically, when the projector 40A is driven, the light beams emitted from the light sources 11a to 11c are guided toward the eyes of the driver 42. The partial reflection plane forms a virtual image Sc' at a location in front of the front window glass 41 using the light beams. Thus, an image is displayed as the virtual image Sc' for the driver 42.

Example 5

In the head-up display illustrated in FIG. 17, the light beams emitted from the projector 40A and reflected from the partial reflection plane 41a forms an image on the retina of the driver 42 while regarding a location in front of the front window glass 41 as a virtual projection object.

Figure 18:
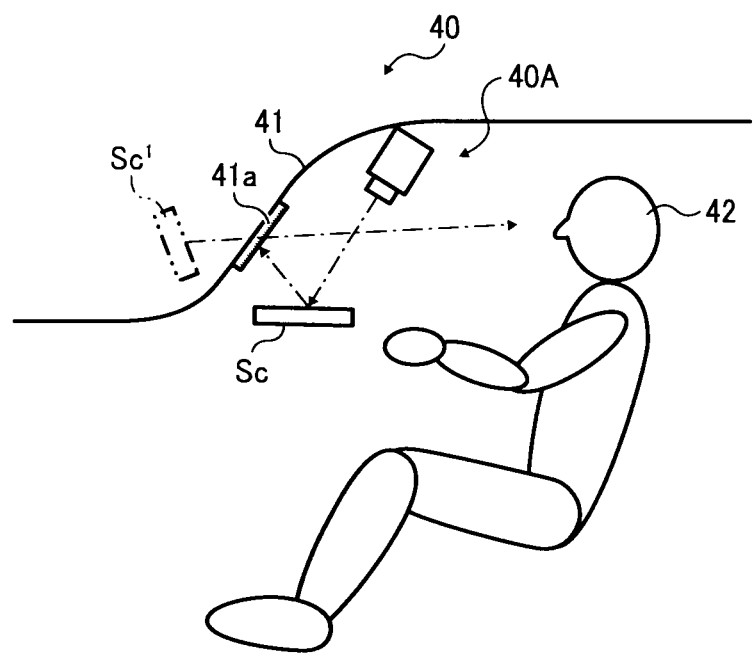
FIG. 18 is a schematic view illustrating another example of the vehicle-use head-up display device of the present invention.
Figure 19:
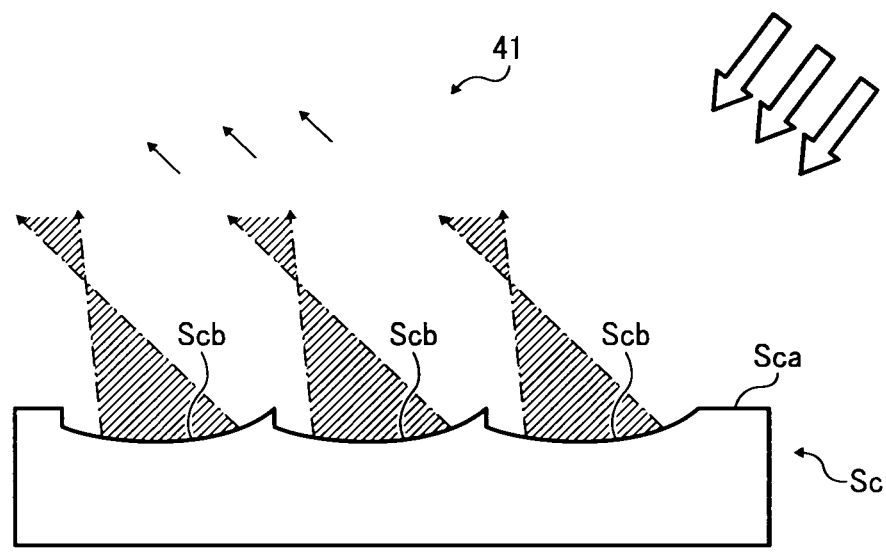
FIG. 19 is a side view illustrating the screen of the head-up display device illustrated in FIG. 18.

Another head-up display including the projector of the present invention is illustrated in FIG. 18. As illustrated in FIG. 18, the screen Sc is formed on the installment panel (i.e., dashboard) of the car. The projector 40A forms an image on the screen Sc, and the projected image is displayed for the driver 42 via the partial reflection plane 41a. Similarly to the display device illustrated in FIG. 17, the projected image is displayed as the virtual image Sc' at a location in front of the front window glass 41. In this regard, it is preferable to use a reflection type screen for the screen Sc, which has an entrance surface Sca illustrated in FIG. 19. As illustrated in FIG. 19, the entrance surface Sca includes plural concave mirrors Scb slanted in a predetermined direction relative to the entrance surface Sca.

The projector 40A is arranged in a slanting direction relative to the entrance surface Sca of the screen Sc so that the light beams (indicated by outlined arrows) emitted from the light sources 11a to 11c are slantingly incident to the concave mirrors Scb.

Each of the concave mirrors reflects the light beams toward the front window glass 41 as indicated by black arrows. Namely, the screen Sc has a directional characteristic of reflecting the light beams emitted from the projector 40A toward the front window glass 41.

Specifically, the shape of the concave mirrors Scb changes in the direction of from the driver 42 to the front window glass 41. Namely, the concave mirrors Scb have such directional characteristics as to reflect the light beams emitted from the projector 40A toward a predetermined region of the front window glass 41. Thus, in this head-up display device 40 illustrated in FIG. 18, the light beams emitted from the light sources obliquely enter to the screen Sc, and the incident light beams are reflected at the screen toward the front window glass 41 while having a directional characteristic.

The light beams emitted from the light sources are reflected from the partial reflection plane 41a of the front window glass 41 toward the driver 42. Therefore, the driver 42 can view a virtual image Sc' formed at a location in front of the front window glass 41.

According to the vehicle-use head-up display device illustrated in FIG. 18, the screen Sc has a directional characteristic of reflecting the light beams, which enter to the screen Sc from every angle, toward the front window glass 41. Thus, the light beams are guided to the front window glass 41 while decreasing the loss of light amount thereof. As a result, an image having high brightness (i.e., good visibility) can be displayed for the driver 42.

Example 6

Figure 20:
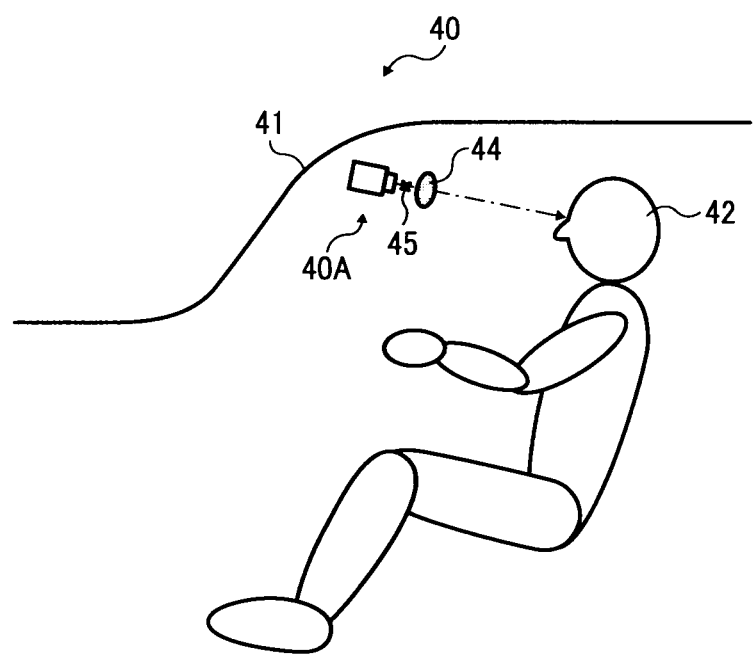
FIG. 20 is a schematic view illustrating yet another example of the head-up display device of the present invention.

FIG. 20 is a schematic view illustrating a vehicle-use head-up display device using a projector, which directly forms an image on the retina of the driver 42, wherein the driver can view the image due to an afterimage effect.

The projector 40A directly forming an image on the retina focuses two-dimensionally deflected light beams on a primary imaging plane 45, followed by formation of a two-dimensional image on the retina of the driver 42 through an eyepiece optical system 44. The projectors mentioned above in Examples 1 to 3 can be used for this projector 40A.

In this projector 40A, the eyepiece optical system 44 is provided in front of the projector. The light beams emitted from the projector 40A are focused once on the primary imaging plane 45. The thus focused light beams then become diffusion light beams, and enter into the eyepiece optical system 44. The eyepiece optical system 44 converts the diffusion light beams to parallel light beams to guide the light beams to the eyes of the driver 42. The light beams are focused on the retina of the driver by the lens of the eyes, resulting in formation of focused spots thereon.

Thus, by performing two-dimensional deflection scanning with light beams using a light deflector, two-dimensional scanning of focused spots S is performed on the retina of the driver 42. As a result, due to the afterimage effect of the focused spots formed the retina of the driver by scanning, the driver can view the projected image.

This document claims priority and contains subject matter related to Japanese Patent Application No. 2008-131432, filed on May 20, 2008, incorporated herein by reference.

Having now fully described the invention, it will be apparent to one of ordinary skill in the art that many changes and modifications can be made thereto without departing from the spirit and scope of the invention as set forth therein.

What is claimed as new and desired to be secured by Letters Patent of the United States is:

1. A projector which projects an image corresponding to an original image on a projection object by scanning the projection object with a light beam, comprising:
    a light source configured to emit a light beam;
    a projection optical system including:
        a divergence angle converter configured to convert a divergence angle of the light beam so that focused spots are formed on the projection object; and
        a light deflector configured to deflect the light beam from the divergence angle converter in a light beam scanning direction and a direction perpendicular to the light beam scanning direction to form the focused light spots on pixel portions of the projection object such that positions of the pixel portions correspond to positions of pixels of the original image;
    a light deflector drive controller configured to control the light deflector to form the focused light spots on the pixel portions of the projection object on the basis of positional data of the pixels;
    a light amount controller configured to control light amount of the light beam emitted by the light source on the basis of luminance data for the pixels; and
    an image processor configured to correct the luminance data for each pixel on the basis of previously obtained data concerning deterioration in quality of the projected image to correct data concerning deterioration in quality of the projected image for each pixel, which is caused by the projection optical system including the divergence angle converter and the light deflector, and to output the corrected luminance data to the light amount controller while outputting the positional data to the light deflector drive controller,
    wherein the image processor includes:
    a pixel data correction part configured to correct the luminance data for each pixel on the basis of the previously obtained deterioration data of the projected image;
    a judgment part configured to judge whether the corrected luminance data for each pixel falls out of an adjustable range of the light amount controller; and
    a substitution process part configured to substitute the corrected luminance data judged to fall out of the adjustable range with the luminance data for the pixels.

2. A projector which projects an image corresponding to an original image on a projection object by scanning the projection object with a light beam, comprising:
    a light source configured to emit a light beam;
    a projection optical system including:
        a divergence angle converter configured to convert a divergence angle of the light beam so that focused spots are formed on the projection object; and
        a light deflector configured to deflect the light beam from the divergence angle converter in a light beam scanning direction and a direction perpendicular to the light beam scanning direction to form the focused light spots on pixel portions of the projection object such that positions of the pixel portions correspond to positions of pixels of the original image;
    a light deflector drive controller configured to control the light deflector to form the focused light spots on the pixel portions of the projection object on the basis of positional data of the pixels;
    a light amount controller configured to control light amount of the light beam emitted by the light source on the basis of luminance data for the pixels; and
    an image processor configured to correct the luminance data for each pixel on the basis of previously obtained data concerning deterioration in quality of the projected image to correct data concerning deterioration in quality of the projected image for each pixel, which is caused by the projection optical system including the divergence angle converter and the light deflector, and to output the corrected luminance data to the light amount controller while outputting the positional data to the light deflector drive controller,
    wherein the image processor includes:
    a pixel data correction part configured to correct the luminance data for each pixel on the basis of the previously obtained deterioration data of the projected image;
    a judgment part configured to judge whether the corrected luminance data for each pixel falls out of an adjustable range of the light amount controller; and
    a substitution process part configured to substitute the corrected luminance data judged to be greater than a maximum value of the adjustable range with the maximum value, and to substitute the corrected luminance data judged to be less than a minimum value of the adjustable range with the minimum value,
    wherein the light source emits red, green and blue light beams, and the luminance data include red, green and blue color luminance data, and wherein when the judgment part judges that one of the red, green and blue color luminance data is greater than the maximum value, the substitution process part substitutes the corrected color luminance data with the maximum value while adjusting the other two color luminance data so that a ratio of re-corrected three color luminance data is equal to that before re-correction processing, and when the judgment part judges that one of the red, green and blue color luminance data is less than the minimum value, the substitution process part substitutes the corrected color luminance data with the minimum value while adjusting the other two color luminance data so that the ratio of the re-corrected three color luminance data is equal to that before the re-correction processing.

3. A head-up display device comprising:
the projector according to claim 1; and
at least one of a partial reflection plane configured to reflect a light beam emitted from the light source of the projector, and
an eyepiece optical system configured to convert diffusion light beam emitted from the projector to parallel light beam.

4. A head-up display device comprising:
the projector according to claim 2; and
at least one of a partial reflection plane configured to reflect a light beam emitted from the light source of the projector, and
an eyepiece optical system configured to convert diffusion light beam emitted from the projector to parallel light beam.

* * * * *